US007023871B2

(12) United States Patent
Lind et al.

(10) Patent No.: US 7,023,871 B2
(45) Date of Patent: Apr. 4, 2006

(54) WIDEBAND DOCSIS ON CATV SYSTEMS USING PORT-TRUNKING

(75) Inventors: Paul Alan Lind, Santa Cruz, CA (US); Robert James Fanfelle, Redwood City, CA (US); Selim Shlomo Rakib, Cupertino, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 99 days.

(21) Appl. No.: 10/446,511

(22) Filed: May 28, 2003

(65) Prior Publication Data

US 2004/0244043 A1 Dec. 2, 2004

(51) Int. Cl.
*H04J 3/16* (2006.01)
(52) U.S. Cl. .................... 370/437; 370/465; 725/111
(58) Field of Classification Search ............. 370/464, 370/465, 480, 486, 431, 437; 348/552, 388; 725/111, 117, 118, 126
See application file for complete search history.

(56) References Cited

U.S. PATENT DOCUMENTS

| | | | | |
|---|---|---|---|---|
| 6,704,372 | B1 * | 3/2004 | Zhang et al. | 375/316 |
| 6,804,251 | B1 * | 10/2004 | Limb et al. | 370/444 |
| 2002/0131403 | A1 * | 9/2002 | Desai et al. | 370/352 |
| 2002/0131426 | A1 * | 9/2002 | Amit et al. | 370/401 |
| 2002/0132629 | A1 * | 9/2002 | Desai et al. | 455/500 |
| 2002/0133618 | A1 * | 9/2002 | Desai et al. | 709/238 |
| 2003/0058885 | A1 * | 3/2003 | Sorenson et al. | 370/468 |
| 2003/0083054 | A1 * | 5/2003 | Francesca et al. | 455/418 |
| 2004/0076181 | A1 * | 4/2004 | Pantelias et al. | 370/468 |
| 2004/0163129 | A1 * | 8/2004 | Chapman et al. | 725/126 |

OTHER PUBLICATIONS

Fellows, David, et al, "DOCSIS Cable Modem Technology", Mar. 2001, IEEE Communications Magazine, pp. 202-209.*

(Continued)

*Primary Examiner*—Dang Ton
*Assistant Examiner*—Robert C. Scheibel, Jr.
(74) *Attorney, Agent, or Firm*—Thelen Reid & Priest LLP

(57) ABSTRACT

Method and apparatus to carry out wideband DOCSIS both upstream and downstream in a point-to-multipoint environment of an HFC system using port trunking concepts. For the downstream, each CMTS has a frame distributor which distributes frames to various transmitters transmitting on downstream channels to be used to transmit downstream data simultaneously to a CM using wideband DOCSIS. The frame distributor adds sequence numbers in some embodiments to guarantee proper order of frames can be restored at the CM, and schedules transmissions according to quality of service considerations to meet guaranteed and committed portions of constant bit rate and variable bit rate flows. The CMTS sends and Extended Channel Enable (ECE) message to wideband capable CMs telling them which downstreams to enable. Each CM has a frame collector to which all frames received on various downstream channels are sent. The frame collector makes sure they are all there, puts them into the proper order and delivers them to a NI. Upstream wideband DOCSIS works the same way with a frame distributor in each CM and a frame collector in the CMTS. The CMTS receives bandwidth requests and controls upstream wideband DOCSIS transmissions by sending downstream UCD and MAP and ECE messages to the CMs instructing them which upstream channels to use, describing the parameters of the channel and assigning times for transmission which are simultaneous on multiple channels for upstream wideband capable CMs.

9 Claims, 13 Drawing Sheets

OTHER PUBLICATIONS

Dutta-Roy, Amitava, "An Overview of Cable Modem Technology and Market Perspectives", Jun. 2001, IEEE Communications Magazine, pp. 81-88.*

IEEE Standard 802.3 Year 2000 Edition.

Desai et al., *FastChannel*: A Higher Speed Data Service, AT&T Labs-Research, Published early 2002 on information and belief.

* cited by examiner

DOCSIS: PRIOR ART NON PORT TRUNKING

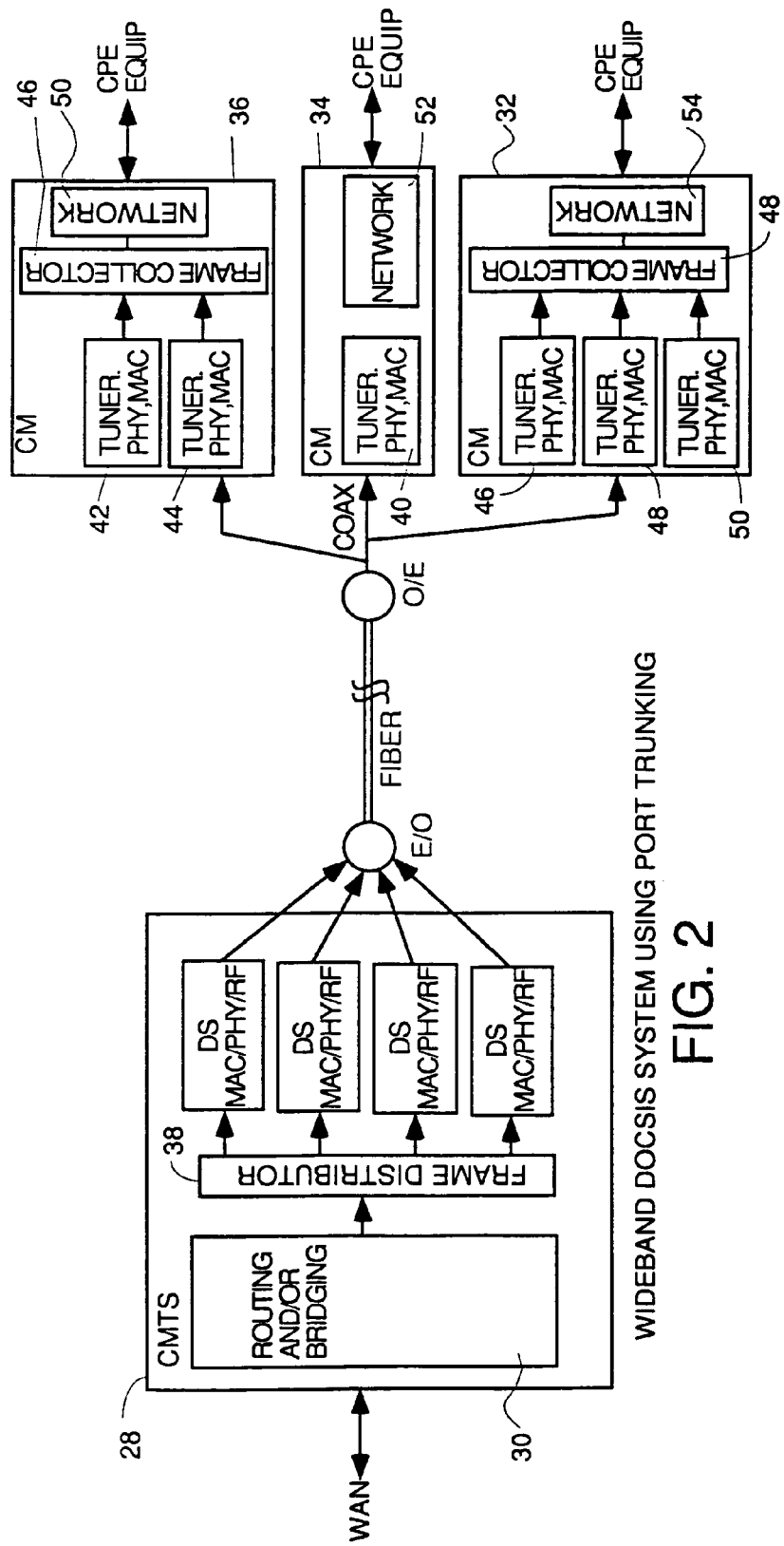

ILLUSTRATION OF DOCSIS FRAME ENCAPSULATION
MODIFIED TO SUPPORT WIDEBAND DOCSIS

| FLOW ID | FROM->TO | CHARACTERISTICS |
|---|---|---|
| f-TA-1 | T->A | BEST EFFORT, PEAK=pA1 |
| f-TA-2 | T->A | CONSTANT RATE, RATE=rA2 |
| f-TA-3 | T->A | CONSTANT RATE, RATE=rA3 |
| f-TB-1 | T->B | VARIABLE RATE, RATE=rB1 PEAK=pB1 |
| f-TB-2 | T->B | BEST EFFORT, PEAK=pB2 |
| f-TC-1 | T->C | CONSTANT RATE, RATE=rC1 |
| f-TD-1 | T->D | BEST EFFORT, PEAK=pD1 |
| f-TD-2 | T->D | BEST EFFORT, PEAK=pD2 |
| f-TD-3 | T->D | VARIABLE RATE, RATE=rD3 PEAK=pD3 |

WIDEBAND DOCSIS ON CATV SYSTEMS USING PORT-TRUNKING

BACKGROUND OF THE INVENTION

Cable modems and the DOCSIS (Data Over Cable Service Interface Specification) standard have made delivery of digital services over hybrid fiber coaxial (HFC) cable television systems possible. Digital data delivery of Internet data, video on demand movies, telephony, telephony over the Internet, interactive games, upstream delivery of security camera digital photos to security services and a host of other applications is becoming possible. These services are very useful and valuable, some more than others. Some services take more bandwidth than others. Video on demand over the HFC system is seen by many as the killer application for the future. Video and movies, even when compressed with MPEG, take large amounts of bandwidth and substantially more bandwidth than delivery of Internet data. A general rule of thumb for MPEG-2 compression is 3 to 3.5 MB/s per video stream. Statistical multiplexing of a 3.5 MB/s stream over a 38 MB/s channel is poor. Increasing the rate per customer premises equipment can improve statistical multiplexing dramatically. Although this does not benefit the customer, it is of great benefit to the service provider cable system operators who buy cable modems and cable modem termination systems.

A technique called port trunking or link aggregation has been used in prior art telephone systems and other data communication systems. Two relevant standards for port trunking outside the world of HFC systems exist: IEEE 802.3 ad for link aggregation over Ethernet; and Multilink-PPP as described in RFC 1990.

Neither of these standards mention DOCSIS nor could they be used in a DOCSIS system. This is because both of these standards require point-to-point links, and DOCSIS is a point-to-multipoint link environment. There are no point-to-multipoint versions of port trunking specified anywhere to the knowledge of the inventors.

HFC systems are shared by multiple users, so the bandwidth available to each customer is not unlimited. A DOCSIS QAM 64 channel has a bandwidth of 6 megahertz (MHz) and a payload capacity of 27 megabits per second (MB/s). QAM 256 modulation is used in the more advanced versions of DOCSIS, but still the channels are 6 MHz wide and the payload capacity is only 38 MB/s. In Europe, QAM 64 channels are 8 MHz in bandwidth and 38 Mb/s, and QAM 256 channels have payload capacity of 51 MB/s. Each channel has its own frequency slot.

The payload capacity represents the total aggregate bandwidth available shared by all the cable modems (CM) that are tuned to that particular channel. The payload capacity also represents the maximum burst rate that is available to a single CM at any moment in time. Some services require more payload delivery capacity than this.

Current DOCSIS only provides for increasing the aggregate capacity only by allowing the transmission of multiple channels at the CMTS (cable modem termination system), or headend, and splitting the population of cable modems so that some are tuned to each of the available channels. This does increase the aggregate capacity across a given population size of CMs, but does not increase the burst capacity to any single CM. So that problem still remains, and it is a significant problem for the best customers who have high demand for data.

DOCSIS does have a mechanism to direct CMs tuned to one downstream (DS) channel to tune to another DS channel for load balancing purposes, but this method takes many 10s of milliseconds during which the CM is unable to receive any data while it is re-tuning its receiver, waiting for another invitation to perform ranging (ranging means DOCSIS ranging and equalization followed by downstream messages to the CMs indicating how they should adjust their timing, frequency, phase, power and including upstream equalization coefficients for use in developing new upstream equalization filter coefficients and will hereafter be referred to simply as ranging) on the new channel and performing the ranging process again during the designated ranging window on the new channel.

It is desirable to increase the traffic rate to CMs for three reasons:

1. to increase the average data rate available to all connected CMs since the data rate of services rises over time;
2. to increase the burst rate to a single CM; and
3. to increase the level of statistical multiplexing of data traffic on the channel.

The existing DOCSIS protocols only address problem #1 listed above. Problems #2 and #3 listed above can only be resolved by increasing the instantaneous available bandwidth to a single modem.

There are only two methods to increase the capacity to a single device:

1. increase the capacity per channel; or
2. increase the number of channels available to cable modems which have the ability to tune to multiple channels simultaneously and share capacity among them.

Other workers skilled in the art such as engineers at Broadcom are attacking this problem of increasing the capacity of a channel so as to increase the maximum burst rate to a single CM by attempting other approaches than are described herein. Generally, these other approaches involve physical layer techniques. These techniques include: increasing the symbol rate; increasing the modulation order such as by moving from QAM 256 to QAM 512 or QAM 1024; improving the forward error correction encoding so as to be able to detect and correct the larger number of errors which result when more data is sent down a channel of a fixed bandwidth which is already transmitting at maximum capacity; or possibly changing the modulation scheme. One or more of these techniques may be in use now in Broadcom products. Other link layer techniques such as data compression are also being investigated.

Moving to higher density constellations such as QAM 512 and QAM 1024 requires a very quiet channel and high signal to noise ratio (high quality HFC system and good noise suppression) or a high degree of forward error correction and loss of throughput because of the larger number of error detection and correction bits added to the payload data stream. Quiet channels with high signal to noise ratio are hard to achieve and high enough S/N may be impossible to achieve in some older systems.

All of these techniques or approaches have one shared major flaw besides the loss of throughput and stringent requirements placed on the HFC system for high signal to noise ratio. They are not backward compatible, which means they render obsolete all the old single DOCSIS channel CMs on an HFC system that were not designed with these techniques in mind and would require replacement of the CMTS. This is a huge problem, because cable operators have millions of dollars invested in their existing inventory of CMs and CMTS and they do not want to spend similar amounts of money or more to replace it all. Outside of this patent application, nobody that the applicants are aware of has either developed or proposed the use of port trunking in a DOCSIS system.

SUMMARY OF THE INVENTION

According to the teachings of the invention, CMs are constructed to receive multiple channels simultaneously and to share capacity across those channels. This requires changes to the prior art CMs and to the CMTS obviously, but it allows existing prior art CMs to still be used so that the system is backward compatible with older CMs still on the HFC system. The method and apparatus of the invention is inherently backward compatible since each channel in the port trunking group of channels is a full DOCSIS channel and can have legacy CMs that can only receive one channel tuned thereto.

Since there is only one CMTS, the changes to it are not as expensive as the cost to change a CM multiplied by the possible thousands of CMs needed to service all customers. The hardware change cost of the CM is not the only cost. There is also the cost of the service call including costs of rolling the truck and labor costs and the cost of any trade-in/upgrade program, all of which can greatly exceed the cost of the CM hardware change itself. The changes required of the CMTS are to make it aware of the fact or be able to determine that there are CMs on the system capable of performing port trunking by receiving multiple channels simultaneously and share capacity across all these channels. The CMTS can always be upgraded to support port trunking before the CMs with port trunking capability are replaced and port trunking CMs will work fine on old CMTS but only as single DOCSIS channel CMs.

The method of port trunking to create wide band DOCSIS connections downstream generally comprises, from the CMTS perspective:

(1) receiving CM registration messages including data advertising the CM capabilities and determining from this data which CMs are wideband DOCSIS capable and how many downstreams and upstreams each CM can simultaneously use;

(2) sending a Extended Channel Enable (ECE) message to each wideband DOCSIS capable CM telling it which downstreams to enable;

(3) processing incoming frames to be sent downstream to a cable modem in a frame distributor to schedule the distribution of frames to the various transmitters transmitting on the downstream channels to which the CM is tuned so as to meet quality of service requirements, add sequence numbers or do other things to guarantee the frames can be put into the proper order at the receiver side and distribute the frames (such as transmit all frames from an IP flow on the same DOCSIS channel in the correct order or put sequence numbers in the private_section of MPEG-2 transport syntax for MPEG compressed data);

(4) transmitting the released frames addressed to a particular cable modem to that cable modem on the downstream channels to which said cable modem has been instructed to tune.

In other species of this genus wherein both upstream and downstream wideband DOCSIS operations are carried out, the CMTS also:

receives upstream bandwidth requests from the various cable modems so that it knows how much upstream traffic there is from each CM, and determines how much downstream traffic there is to each CM from the information the frame distributor is receiving from the router;

schedules transmission of downstream frames for each IP flow to a particular CM using a Quality of Service algorithm so as to at least meet guaranteed and committed bit rates of constant bit rate and variable bit rate with committed portion IP flows;

schedules transmission of upstream frames for each IP flow from a particular CM using a Quality of Service algorithm so as to at least meet guaranteed and committed bit rates of constant bit rate and variable bit rate with committed portion IP flows and so as to fulfill as much as possible the bandwidth requests;

generates and transmits MAP messages and UCD messages for each DOCSIS upstream with the grants in the MAP messages allowing simultaneous upstream transmissions on different DOCSIS upstreams from each wideband capable CM so as to implement upstream wideband DOCSIS operations;

releases downstream frames to the various downstream transmitters for the various IP flows addressed to each particular CM at the appointed times per the schedule so as to implement wideband DOCSIS downstream transmissions to wideband capable CMs;

receives upstream wideband DOCSIS frames from various CMs, verifies that all the frames are present in each IP flow from each CM, and puts the frames in the proper order and delivers the frames for further processing.

The preferred process for implementing a quality of service algorithm comprises the following steps:

determining the particular downstreams to which each wideband DOCSIS CM is tuned using the registration data and data from transmitted ECE messages and determine the particular IP flows directed to each wideband CM from header data in packets received from a router;

verify which downstreams to which a particular CM is tuned and which has an IP flow to be sent to it are available for transmission and determine the quality of service requirement of each IP flow;

schedule the guaranteed portions of contant bit rate flows and the committed portions of variable bit rate flows on available downstream DOCSIS channels to which CMs are tuned which have IP flows with quality of service requirements which are constant bit rate or variable bit rate flows with guaranteed portions; generate frame release signals and release and transmit frames at the scheduled times on the appropriate downstream DOCSIS channels to fulfil said guaranteed bit rates of constant bit rate QoS IP flows and to fulfil committed bit rate portions of variable bit rate QoS IP flows; and for any wideband downstream CMs which have IP flows directed thereto with other than guaranteed bit rate Qos IP flows or variable bit rate QoS IP flows with committed portions, use any times on DOCSIS downstreams to which said CMs are tuned when no releases of frames to said CM or other CMs are scheduled or when there is no traffic to release frames directed to said CMs which have IP flows directed thereto with other than guaranteed bit rate Qos IP flows or variable bit rate QoS IP flows with committed portions.

Wideband DOCSIS downstream from the CM perspective comprises the following steps.

(1) Powering up or rebooting and searching for and locking onto a DOCSIS downstream;

(2) Ranging using the DOCSIS upstream associated with the DOCSIS downstream to which the cable modem locked, and registering with the CMTS as a CM on the system;

(3) Sending information to the CMTS indicating how many tuners the CM has which are capable of use in wideband downstream DOCSIS.

(4) receiving an ECE message from said CMTS indicating how many and which downstream channels will be used for wideband DOCSIS transmissions to said CM and responding thereto by tuning a tuner of said CM to each of the downstream channels designated in said ECE message;

(5) receiving wideband downstream DOCSIS frames simultaneously transmitted on two or more downstream channels designated by said ECE message and verifying that all frames have been received;

(6) putting said received frames into the proper order, and delivering said frames to a peripheral device coupled to said CM for further processing.

It is important that the transmitted frames of an IP flow be put in the proper order by the receiver after being transmitted, and this applies to wideband DOCSIS either upstream or downstream. This can be done in at least two ways. First, all frames of an IP flow can be restricted to be transmitted on the same downstream channel. As long as they are transmitted in the correct order, they will be received in the correct order in this class of embodiments, regardless of different latencies on the same channel affecting different frames differently. In a second class of embodiments, the frame distributor can add sequence numbers to all the frames transmitted, and particularly to all frames in a single IP flow so that even if they are transmitted out or order or are received out of order because of different latencies on the different channels on which they were transmitted, they can still be put into the proper order at the receiver using the sequence numbers.

The wideband upstream DOCSIS process genus is defined as follows.

1) The CMTS frequently broadcasts UCD messages each one of which defines the frequency, symbol rate, modulation type and other parameters of an identified DOCSIS upstream which is one of a plurality of such channels. From the CM perspective, the CM receives the UCD messages and stores the data thereof for later use when an upstream is enabled.

2) Having a CM power up, find a downstream DOCSIS channel and perform ranging and registration in the normal way on a DOCSIS upstream. From the CMTS perspective, the CMTS receives the ranging burst, performs measurements and equalization convergence and sends one or more downstream messages to each CM that has sent a ranging burst giving the CM timing, frequency and power offsets and upstream equalization coefficients to use in controlling and filtering subsequent upstream bursts. The CM then sends an acknowledgment that it has successfully trained and sends an upstream registration message which indicates its capabilities including whether it is upstream and downstream wideband DOCSIS capable and how many DOCSIS upstreams it can simultaneously transmit upon. The CMTS receives these message and stores at least some of the data therein regarding upstream DOCSIS capability.

3) The CMs receive requests from user applications requesting to send upstream data and/or receive downstream data. The CM responds by send upstream bandwidth requests to the CMTS and information pertaining to the requested downstream data. The CMTS receives upstream bandwidth requests from the CMs and uses registration data to determine which CMs are upstream wideband DOCSIS capable and determines how many upstream channels each CM which has requested upstream bandwidth can simultaneously transmit upon 5) If both CM and CMTS are wideband DOCSIS capable, then the CMTS analyzes the upstream traffic requests and decides whether to turn upstream port trunking capability on for CMs which have upstream traffic, are wideband upstream DOCSIS capable and have a subscription for upstream wideband DOCSIS operation.

6) The CMTS uses a quality of service algorithm to schedule upstream grants for each IP flow from each CM and generates separate MAP messages for each DOCSIS upstream a CM is scheduled to use for upstream wideband DOCSIS, each MAP message scheduling when the CM or CMs having grants in the MAP message may transmit on the DOCSIS upstream to which the MAP message pertains.

7) Upstream wideband DOCSIS is turned on by the CMTS using the grants in the MAP messages to determine which CMs that are wideband DOCSIS capable in the upstream need to use multiple upstream DOCSIS channels. Upstream wideband DOCSIS is then turned on for each such CM by sending an ECE message to the CM which tells it which upstreams to use for upstream wideband DOCSIS transmissions. The MAP messages in step 6 are also sent. The CM receives these ECE messages and sets up its transmitters to transmit on the designated DOCSIS upstreams in accordance with the parameters established by the UCD message that pertains to that DOCSIS upstream. The CM receives these MAP messages and uses the data therein to time its transmissions upstream on the upstream channels enabled by the ECE messages.

8) The CMTS receives all the frames transmitted by the CMs and passes them to a frame collector which makes sure that all frames of all IP flows transmitted by all CMs are present and puts them into the proper order for each IP flow and delivers them for processing.

A key point is that the legacy single channel CMs can share any single channel within the multiple channels being simultaneously received by the wideband CMs for the downstream or use any upstream DOCSIS channel in the port trunk in a conventional way so as to make the system backward compatible.

Although the invention is described herein in terms of DOCSIS and cable modem termination systems and cable modems, the teachings of the invention are broadly applicable to any transport mechanism and any transmission medium coupling a single transceiver to a plurality of transceivers by a shared medium in a point-to-multipoint system architecture such as cell phone systems or fixed wireless. Cellular and PCS systems are point-to-multipoint in any particular cell. References to CMTS in the claims and elsewhere herein should be understood as references to the single transceiver and references to CMs in the claims and elsewhere herein should be understood as references to the multiple transceivers which share a medium and transport mechanism to communicate with the single transceiver. References to HFC or hybrid fiber coax in the claims and elsewhere should be understood as references to any shared medium of transmission in a point-to-multipoint architecture including cell phone or PCS systems and fixed wireless proposals to replace cable system. References to DOCSIS should be understood as references to any transport mechanism for point-to-multipoint communications.

BRIEF DESCRIPTION OF THE DRAWINGS

FIG. 2 is a diagram of a wideband DOCSIS system which implements port trunking to send data from the CMTS to a CM on multiple DOCSIS channels simultaneously.

FIG. 3A is a diagram of the original prior art DOCSIS PDU encapsulation scheme.

FIG. 3B is a diagram of the original DOCSIS PDU encapsulation scheme as modified to add the sequence number needed for the encapsulation method of implementing wideband DOCSIS.

DETAILED DESCRIPTION OF THE PREFERRED AND ALTERNATIVE EMBODIMENTS

Figure 1:
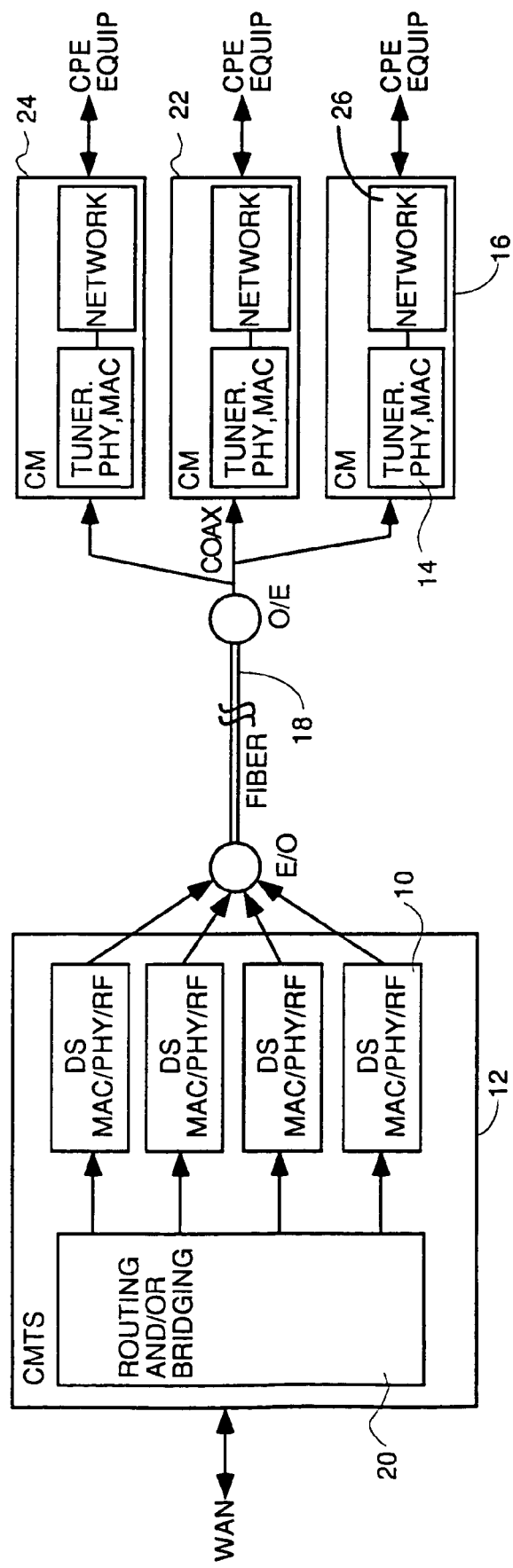
FIG. 1 is a diagram of a prior art, non port trunking DOCSIS system that shows the functional blocks needed in any DOCSIS system.

Referring to FIG. 1, there is shown a functional block diagram of a prior art DOCSIS system which is not capable of using the port trunking concepts. This diagram is helpful in understanding the background prior art and how to implement port trunking in DOCSIS systems. The DS MAC/PHY/RF interface block 10 in the CMTS 12 contains all the known hardware and software needed to FEC encode and encapsulate MAC data frames and modulate (including multiplexing) into an RF channel or carrier signal having a 6 MHz or 8 MHz bandwidth. The tuner, PHY and MAC block 14 in the CM 16 comprises all the known circuitry and software to tune a single RF channel transmitted on HFC 18, demodulate, and de-encapsulate and error correct the received data frames. These two blocks comprise the PHY and a portion of the LINK layer in the 7-layer OSI model.

Figure 12:
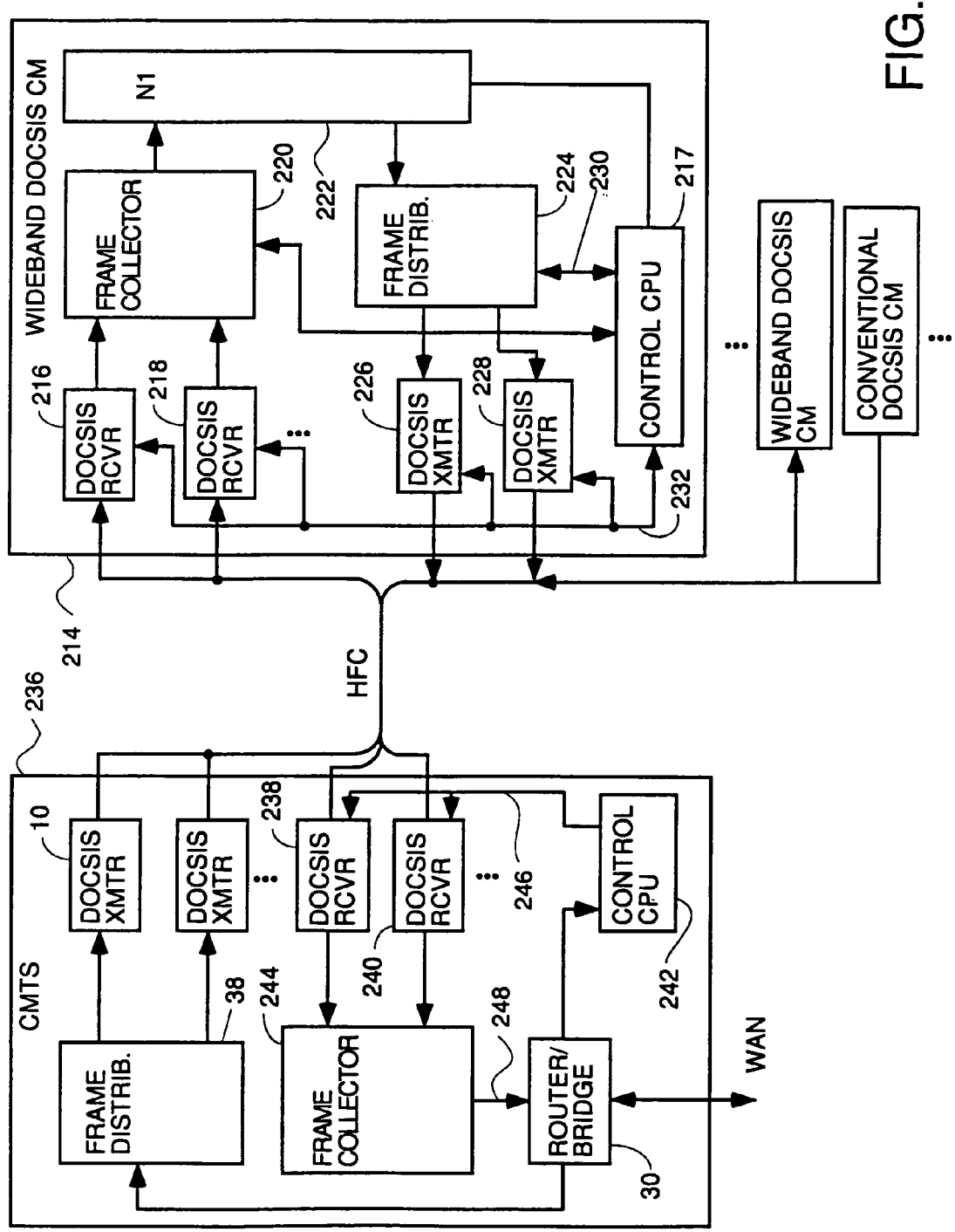
FIG. 12 is a block diagram of a system comprised of a plurality of wideband DOCSIS CMs that are capable of wideband DOCSIS transmissions in both the upstream and downstream direction along with one or more conventional single DOCSIS channel CMs, all coupled by a shared HFC system to a single CMTS.

The CMTS 12 has four separate downstream transmitters 10, 11, 13 and 15 (the upstream receivers are not shown in this figure which is addressed to downstream wideband DOCSIS but see FIG. 12 where CMTS 236 has multiple upstream DOCSIS receivers for upstream wideband DOCSIS. In alternative embodiments, a CMTS with multiple upstream DOCSIS receivers which does only upstream wideband DOCSIS may be used. The CMTS also has a routing and/or bridging function 20 which routes packets addressed to various IP addresses or MAC addresses in or behind the CMs (e.g., a personal computer coupled to the CM by a bus or LAN) to the appropriate downstream transmitter 10, 11, 13 or 15. Three separate CMs 16, 22 and 24 are shown coupled to the same HFC system 18, and each can only tune to one DOCSIS channel at any particular time. Each has a network or bus interface referred to herein as an NI of which 26 is typical. The NI may be USB, USB2, Firewire as well as Ethgernet or 802.11 WiFi.

To provide port trunking, two things are required:
1. a method to distribute frames from the CMTS routing/bridging engine addressed to a particular CM to multiple RF channels to which the CM is tuned; and
2. a method in the CM to receive multiple RF channels and collect frames from each channel and pass them to the higher layers for reassembly in the correct sequence.

FIG. 2 is a diagram of a wideband DOCSIS system which implements port trunking to send data from the CMTS to a CM on multiple DOCSIS channels simultaneously. CMTS 28 includes a routing or bridging function 30 which routes or bridges all packets addressed to the CMs 32, 34 and 36 or to a computer or other peripheral behind the CM and connected to the CM by a LAN or bus to a frame distributor 38. The router 28 may perform a conventional routing function using the OSI model layer 3 IP address in the incoming packets. The address information in the incoming packet is used to along with routing tables to determine to which CM the packet should be sent. The bridging function works conventionally if a bridge is used instead of a router. Each CM is coupled to one or more peripherals such as personal computers, Macintosh computers, and/or other peripherals via a local area network via a bus. Each computer or peripheral has a MAC address which equates to an Ethernet address if an Ethernet LAN is in use. Processes in execution on the peripheral or the peripheral itself have IP addresses. One function of the router is to determine which CM each IP address is in or behind. The function of the router is to get the right packets to the right places and how exactly that is done is not critical and is implementation specific.

Note that the CMs 32, 34 and 36 include both CMs 36 and 32 which are wideband DOCSIS capable CMs having two tuners and three tuners, respectively, as well as legacy CM 34 which is a conventional DOCSIS CM with only a single tuner 40. CM 36 has two tuners 42 and 44 and can tune two DOCSIS channels simultaneously. CM 32 has three tuners 46, 48 and 50 and can tune three DOCSIS channels simultaneously. Each CM has a network interface card or NI shown at 50, 52 and 54. Each wideband DOCSIS CM has a frame collector of which collectors 46 and 48 are typical. The function of each NI is to send and receive data to and from peripherals coupled to the CM.

Functions of the Frame Distributor

The functions of the frame distributor 38 (or the frame distributor in cooperation with control logic or a control computer and other circuitry in the CMTS such as the DOCSIS transmitters and DOCSIS receiver(s)) is to:

(1) determine from registration data which CMs are wideband capable (each CM when it does its DOCSIS power up ranging sequence uses one tuner and transmitter to train the CM on one DOCSIS channel but when it performs the DOCSIS registration process, it sends a message to the CMTS telling it that the CM is wideband capable and how many tuners it has—the CMTS then records that information in a registration table or other memory);

(2) send downstream messages to each wideband capable CM (hereafter wideband CM) which specify to which downstream DOCSIS channels that wideband CM is to tune (the CMTS can elect to use or not use the wideband capability based upon the level of subscription the user has paid for or the particular service ordered by the use of the CM and the need to use wideband capability to deliver that service effectively, etc.);

(3) determine in any way which CMs have incoming packets from the router and which packets are addressed to wideband capable CMs, and determine to which channels the wideband CMs which have traffic are tuned;

(4) implement some mechanism to insure that the packets addressed to any particular wideband CM are delivered in the correct order (any known mechanism can be used) or are tagged with sequence numbers so that the packets addressed to a particular wideband CM can be placed in the correct order after having been received even if they are received out of order; and (5) distribute the packets addressed to a particular wideband CM to the transmitters coupled to the downstream DOCSIS channels to which that wideband CM is tuned for downstream transmission. In the preferred embodiment, a quality of service algorithm will make the decisions as to which channel on which each packet is to be sent and when based upon various factors to be discussed further below.

Typically, the frame distributor will have a table which associates each CM with one or more channels. Typically, this table is managed by software in the control computer. No control computer is shown in FIG. 2, but the control computer being referred to here is CPU 242 in FIG. 12. In some embodiments, an FPGA or state machine or other hardware only circuitry may replace CPU 242 and any references to a control computer or control means in the claims is intended to also cover these alternative embodiments. Functions 1–3 above are usually carried out by control software in the control computer or by the control circuitry that works with the frame distributor. Functions 4 and 5 are the core functions of the frame distributor per se. However, in some embodiments, represented by FIG. 2, the frame distributor includes all necessary control logic or control software and a microprocessor to control the frame distributor to perform all five of the above listed functions.

Another function of the frame distributor in alternative embodiments is to store transmitted frames for a cache period and monitor for acknowledgement messages from the frame collectors. These acknowledgment messages indicate either that all frames of an IP flow have been received (causing the cache to be flushed of that IP flow) or that designated frames need to be retransmitted.

Functions of the Frame Collector

The function of the frame collector is to:

(1) collect the frames or packets addressed to the same CM and received on the different DOCSIS channels to which the CM is tuned;

(2) put the received packets or frame into the proper order (if they are not received in the proper order) and deliver them to the network interface card for transmission on the LAN.

In alternative embodiments, the frame collector also makes sure all the packets are there (at least in embodiments where sequence numbers are used) and sends an acknowledgment message to the CMTS. This message indicates either that all frames have been received, or, if there is a missing packet or frame, requesting retransmission of at least the missing frame. Making sure that all frames have been received can be done even in the embodiment where sequence numbers are not inserted by the frame distributor and all frames of an IP flow are transmitted on a single DOCSIS channel if the server which generates the IP flow and compresses it by MPEG compression puts a sequence number in the private_section of the MPEG transport packet. The frame collector can then coordinate with an MPEG decoder in each receiver to check these sequence numbers to make sure all MPEG transport packets have been received.

There are many ways of implementing the frame distributor and frame collector functions. For example, both may be implemented purely in software, or they may be implemented in hardware in the data path. Either or both may be implemented in a combination of hardware and software. Finally, the functionality of each may be implemented by a single functional block, or the functionality may be distributed across multiple blocks. For example, the CMTS frame distributor may have a portion of its functionality implemented within the routing/bridging function (in either hardware or software), and a remaining portion implemented in the RF channel. Regardless of how and where the functionality of the frame distributor in the CMTS and the frame collectors in the CMs, both a frame distributor and a frame collector in every CM that is wideband capable must exist.

Frame Ordering

The DOCSIS specs require that frames that belong to a single IP flow must be delivered in order. In the general case, each channel may be configured differently, and therefore each channel may have different data delivery rates and latencies. Therefore, frames may not be randomly assigned to the channels and delivered by the receiver in order of reception as that will cause frames of the same IP flow to be delivered out of order. Therefore, some care must be exercised in the way frames are transmitted and received.

Transparent Method

It is possible to guarantee that all frames from a single IP flow arrive in order if a restriction is implemented which requires that all frames from a single IP flow be transmitted over only one of the multiple logical channels to which a wideband CM is tuned. This guarantees the proper order of delivery if the frames are transmitted in the proper order. This is the method which is used in prior art port trunking systems which comply with the IEEE 802.3 ad specification.

This transparent method has several advantages which include the fact that all processing is done by the CMTS when the frames are transmitted, and no extra processing is required at the CM. Since the CM is the most cost sensitive component since there are so many of them, simplifying the CM with less software and hardware is a significant advantage. Also, the transparent method requires no extra encapsulation of each frame need be performed and no additional header data need be added by the CMTS to each frame in order to transmit the frame. Therefore, less datapath overhead is involved in this method.

There are also several disadvantages to this transparent method. For example, identifying all IP flows is difficult and possibly expensive to implement. The transparent method also will limit the maximum data rate to a single CM if that traffic is on one or a few IP flows. Also, in the case of delivery of several high-rate (3.5 MB/s) video streams, use of the transparent method is likely to limit the efficiency of the statistical multiplexing that may be done.

Sequence Number Method

To guarantee that the packets or frames can be assembled into the correct order after reception without the restrictions of the transparent method, an alternative method is to add a sequence number to the header of each frame. This sequence number must be incremented at the transmission end for each frame sent across a multi-channel group of channels to which a wideband CM is tuned. The sequence number is typically is added by the frame distributor circuit or process 38.

At the receiving end, the CM examines the sequence numbers of the frames received from each channel, and the frames are buffered long enough to deliver them in sequence. This is method is used in non HFC system according to the Multilink-PPP RFC 1990.

Encapsulation

One way of adding sequence numbers is to use another level of encapsulation. There are many ways of doing frame encapsulation, and any one of them will suffice to practice the invention so long as a sequence number can be added. FIG. 3 is an example of one way of using encapsulation to add a sequence number for purposes of implementing wideband DOCSIS. FIG. 3A is a diagram of the original DOCSIS packet in the form of an Ethernet packet encapsulating a PDU or data portion per LLC encapsulation defined in the IEEE 802.3 specification. The Ethernet packet header has a destination address 56, source address 58, a type/length (T/L) field 60 which indicates the type of the packet, and a data portion called a PDU shown at 62 and which usually is an IP packet. FIG. 3B is a diagram of the modified DOCSIS packet having sequence numbers added by the frame distributor and suitable for use in wideband DOCSIS according to the teachings of one embodiment of the invention. Any other mechanism to encapsulate sequence numbers so all frames of an IP flow can be put back into the proper order at the receiver will also suffice to practice the invention. For example, sequence numbers may be added to the private_ section of the MPEG transport stream packet by the server which generates each IP flow, and these sequence numbers can be used by the frame collector to make sure all frames have been received and to put them in the proper order. In the embodiment where the sequence numbers are added by the frame distributor, the destination address and source address are unchanged, but a new value for the type/length field T/L is calculated and included at 64. A new field 66 is added to include the sequence number for this packet, and the new T/L field takes into account the length of the sequence number field. The original T/L field is included at field 60. The original PDU data is shown at 62.

Extended Header in DOCSIS Encapsulation

Figure 4:
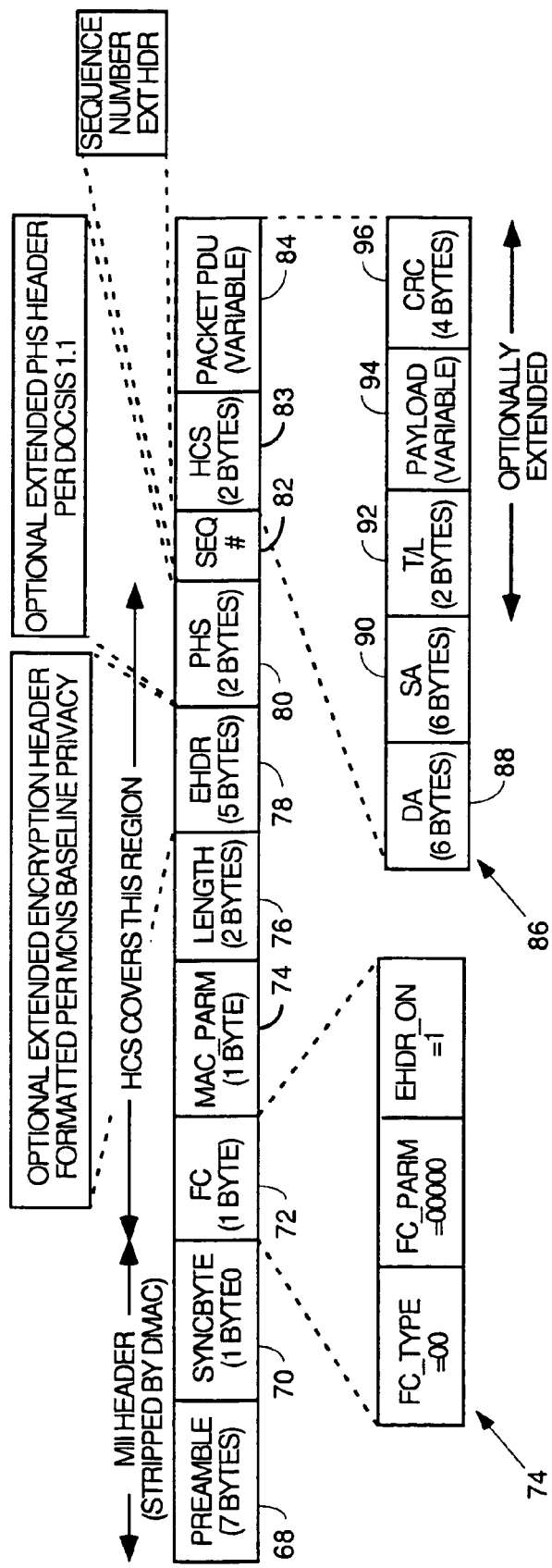
FIG. 4 is a diagram of the prior art DOCSIS frame encapsulation scheme which has been modified to have sequence numbers to support wideband DOCSIS.

The DOCSIS protocol already performs an encapsulation of each frame of data as shown in FIG. 4. The frame of FIG. 4 is comprised of a seven byte preamble field 68, a one byte syncbyte field 70, and a one byte Frame Control (FC) field 72 which is shown in expanded format at 74. The FC field is followed by three bytes of MAC control data in the MAC-PARM field 74 and length field 76. An optional five byte extended header field EHDR 78 is used for encryption purposes for privacy on the cable plant. Another optional extended header field is the extended PHS field 80 which stands for payload header suppression. This field is two bytes long and can be used to extend the capabilities of DOCSIS to suppress repetitive headers. DOCSIS provides the capability to add other extended headers, so the sequence numbers needed for the wideband DOCSIS extension of conventional DOCSIS can be added to a new extended header field not currently defined in DOCSIS. This is the preferred embodiment. This new extended header field bearing a sequence number needed to support wideband DOCSIS is shown at 82.

The HCS field 83 is the media access control check sequence field which contains error detection and correction bytes to allow checking the header information for errors and correcting them.

The PDU field 84 is of variable length, and usually comprises an IP packet encapsulated in an Ethernet packet. It is shown in expanded form at 86 as having a six byte destination address 88, a six byte source address 90, a two byte type/length field 92, a payload data section 94 and a four byte CRC field with error detection and correction data. This is the Ethernet packet format. The PDU of the Ethernet packet is usually an IP packet which itself has a PDU which is usually a UDP or TCP datagram with a UDP or TCP header and a payload portion. The payload portion of the UDP packet is usually a plurality of MPEG packets comprising an MPEG transport stream.

Figure 5A:
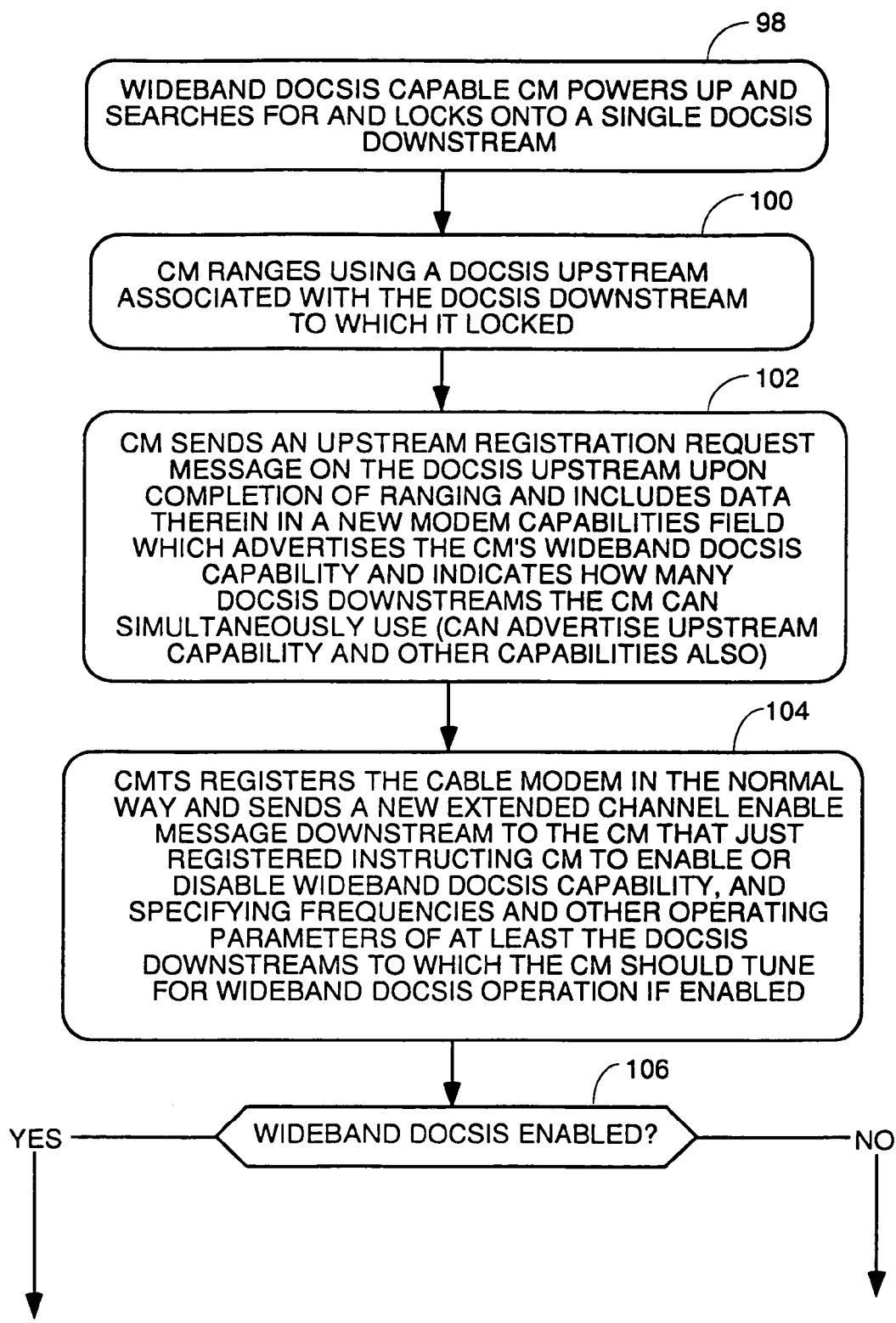
FIG. 5, comprised of FIGS. 5A and 5B is a flowchart of the process performed to establish and use a port trunked point-to-multipoint link across an HFC system using DOCSIS protocols.
Figure 5B:
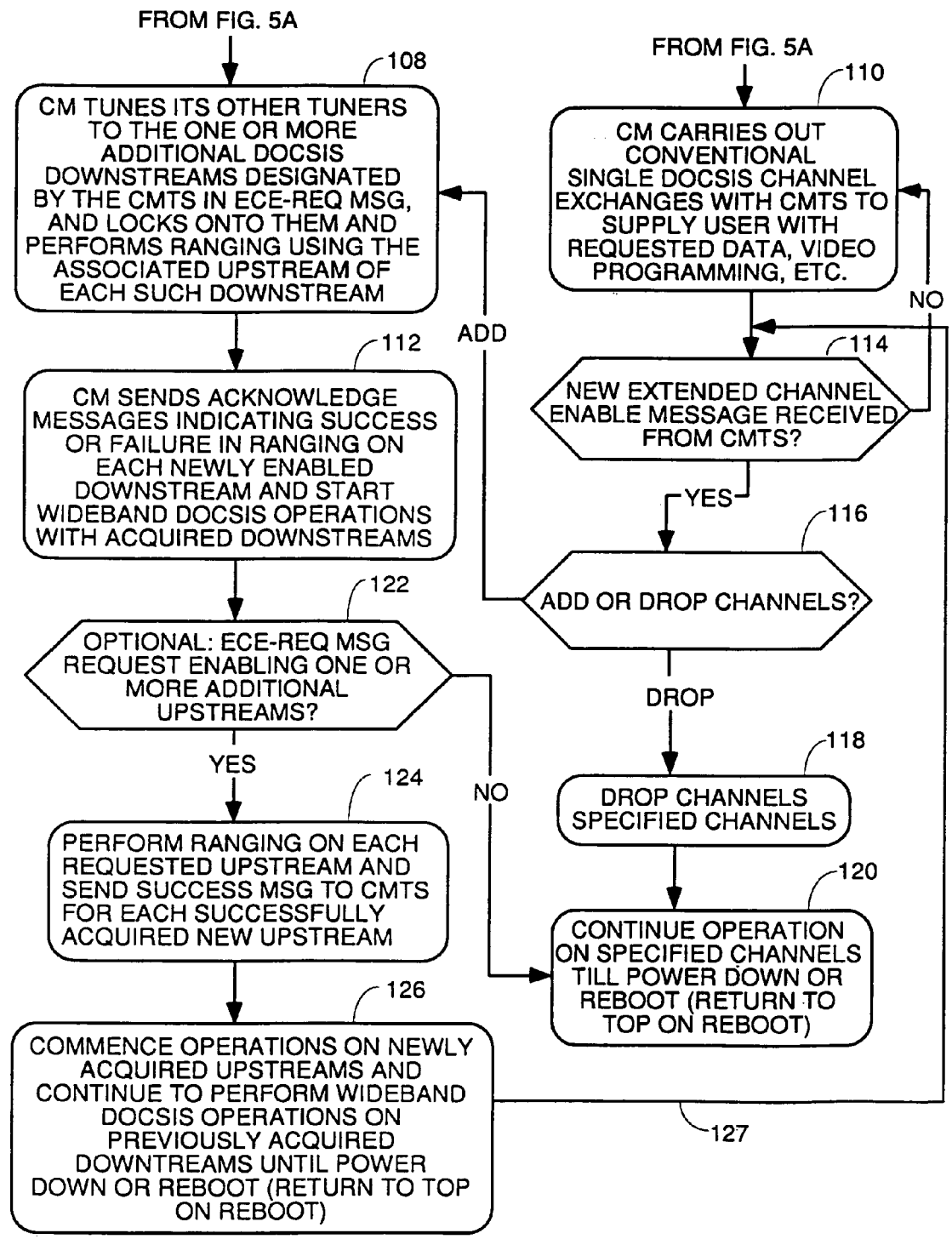

FIG. 5, comprised of FIGS. 5A and 5B, is a flowchart of the processes performed in both the CM and the CMTS (but mainly the CM) to establish a port trunked point-to-multipoint link across an HFC system using DOCSIS protocols. Step 98 is the process of a wideband capable CM booting up and searching for a conventional DOCSIS downstream. Each downstream used in wideband DOCSIS is completely conventional. What is new is to adapt the CMTS and CMs to use multiple conventional downstreams simultaneously to send data from one or more IP flows to the same CM in a point-to-multipoint physical plant and protocol. Every CM in a DOCSIS system searches for a DOCSIS downstream when it first powers up and locks onto it for ranging. The CMTS might tell the CM later to change to a different downstream, but the CM initially locks onto the first DOCSIS downstream it finds.

In step 100, the CM does its conventional DOCSIS ranging including ranging and channel equalization using a DOCSIS upstream associated with the DOCSIS downstream to which the CM previously locked. There may be more than one DOCSIS upstream available for use by the CM. Likewise, all the wideband DOCSIS downstreams may share the same upstream. Technology to do this is described in a U.S. patent application owned by the assignee of this invention and entitled PROCESS FOR SHARING AN UPSTREAM AMONG MULTIPLE DOWNSTREAMS, Ser. No. 10/295,712, filed Nov., 15 2002, which is hereby incorporated by reference.

In step 102, the CM, after ranging is completed, sends an upstream registration request message to the CMTS. "Ranging", as that term is used herein refers to the conventional DOCSIS processes of ranging to find the proper transmit timing offset to achieve upstream synchronization, development of phase and amplitude offset correction factors unique to the cable modem from the preamble symbols of the ranging burst, and performing upstream and downstream equalization. The registration request message is conventional except for a new modem capabilities field. This modem capabilities field contains data which describes the modem's extended downstream and upstream capabilities. Thus, if the CM has three tuners capable of tuning in and recovering the data from three different downstream channels simultaneously and transmitting on the upstream associated with each downstream, these capabilities will be encoded in the data in the modem capabilities field. This is essential to DOCSIS systems which are backward compatible and which may contain legacy CMs which can only tune one channel at a time, but would not be essential in a newly constructed system wherein all the CMs had the same wideband DOCSIS capabilities such that the individual CM capabilities would not need to be described in the upstream registration request message. In systems where legacy modems are present, this new field in the registration message is required and must contain at least the description of how many DOCSIS downstream channels (and what types of downstream channels in terms of the channel parameters the extra CM tuners can receive in some embodiments) the CM can simultaneously receive and process to implement wideband DOCSIS. Optionally, this new field also describes how many upstream channels can be used simultaneously. In species within this genus, step 102 also represents the process of sending upstream bandwidth requests to the CMTS to tell it how much upstream bandwidth the CM needs.

Step 104 represents the process of the CMTS receiving the registration message and registering the modem in the normal way and the CMs that have successfully ranged sending a registration message with the registration messages of the CMs which are wideband capable so indicating and advertising their capabilities. The CMTs then sends a new message in the DOCSIS protocol to the CM. This new message is called the Extended Channel Enable (ECE) message. The ECE message is a downstream message to the CM that just registered instructing that CM to enable or disable wideband DOCSIS capability. The ECE message also specifies the frequencies and other operating parameters of the plurality of downstream channels the CM is to use to receive downstream wideband DOCSIS data. The ECE message can be used at any time by the CMTS to disable wideband DOCSIS operations by any CM, and add or drop downstream channels (or upstream channels in some embodiments) to enlarge or decrease the capacity to any particular CM via wideband DOCSIS.

In other species of this genus, the CMTS:

receives upstream bandwidth requests from the various cable modems so that it knows how much upstream traffic there is from each CM, and determines how much downstream traffic there is to each CM from the information the frame distributor is receiving from the router;

schedules transmission of downstream frames for each IP flow to a particular CM using a Quality of Service algorithm so as to at least meet guaranteed and committed bit rates of constant bit rate and variable bit rate with committed portion IP flows;

schedules transmission of upstream frames for each IP flow from a particular CM using a Quality of Service algorithm so as to at least meet guaranteed and committed bit rates of constant bit rate and variable bit rate with committed portion IP flows and so as to fulfill as much as possible the bandwidth requests;

generates and transmits MAP messages and UCD messages for each DOCSIS upstream with the grants in the MAP messages allowing simultaneous upstream transmissions on different DOCSIS upstream from each wideband capable CM so as to implement upstream wideband DOCSIS operations;

releases downstream frames to the various downstream transmitters for the various IP flows addressed to each particular CM at the appointed times per the schedule so as to implement wideband DOCSIS downstream transmissions to wideband capable CMs;

Test 106 represents the process of the CM receiving the ECE message and determining if wideband DOCSIS has been enabled. If it has, step 108 is performed wherein the CM tunes some or all of its additional tuners to the additional downstream channels specified in the ECE message and locks onto the additional downstream channels. Normally there is one tuner per downstream channel although in alternative embodiments, a single 12 MHz tuner can receive two adjacent 6 MHz bandwidth channels and a digital signal processor can separate the channels and separate demodulators can recover the data on the two channels. References in the claims to a plurality of DOCSIS tuners should be understood as also referring to this alternative embodiment. The CM then performs ranging on each downstream channel using the upstream channel associated therewith. The upstream channel associated with the newly assigned downstream may be the same upstream the CM is already using or it each newly assigned downstream may have its own associated upstream. An upstream is needed for most networking protocols. With regard to wideband DOCSIS in the downstream direction, the upstream is needed for the DOCSIS protocol to establish communication on the downstream. In particular, part of the DOCSIS protocol is to transmit upstream ranging data that the CMTS uses to determine phase and amplitude error correction factors for this particular CM from the preamble of the ranging burst and to determine upstream equalization coefficients to be sent back down to the CM for use by the CM in deriving new upstream equalization filter coefficients for an equalization filter used to filter transmissions upstream to the CMTS. The equalization filter coefficients may be sent down to the CM on any of the downstreams to which it is tuned. More particularly, the upstream is needed to send a registration message after ranging which tells the CMTS that the CM that just completed ranging is wideband capable and upon how many downstream channels it can simultaneously receive data.

In step 112, after ranging has either succeeded or failed on the upstream channel referenced to a DOCSIS downstream of a wideband DOCSIS group being used by a CM, the CM sends an acknowledgement message. The DOCSIS protocol messages define which upstream is associated with each DOCSIS downstream. The acknowledgement message is sent upstream to the CMTS indicates success or failure in ranging on each upstream of a newly enabled downstream. The CM then starts wideband DOCSIS operations using the wideband DOCSIS downstreams on which ranging has been successfully completed.

Step 122 is an optional step which is only performed in embodiments where one or more additional upstreams are to be used in wideband DOCSIS operations. Step 122 represents a test to determine if one or more additional ECE messages have been received requesting enabling of one or more additional upstreams. If not, operations by the CM continue on the previously specified downstream channels until power down or reboot, as symbolized by step 120. If test 122 indicates an ECE message has been received enabling one or more additional upstreams, step 124 is performed next. In step 124, the CM performs ranging on each requested upstream and sends a success message to the CMTS for each upstream channel upon which ranging has been successfully performed. The CMTS then controls upstream traffic on the newly enabled upstreams from a particular CM using the MAP messages of the conventional DOCSIS protocol.

Finally, step 126 is performed to commence operations on the newly acquired upstreams and continue to perform wideband DOCSIS operations on previously acquired downstreams until power down or reboot. The CM must continue to listen for new ECE messages however that add or drop channels and respond thereto appropriately. This function is represented by line 127 connecting step 126 with the test of step 114.

Returning to test 106, if test 106 determines that wideband DOCSIS has not been enabled, step 110 is performed to carry out conventional single channel DOCSIS operations on the single dowstream channel previously acquired (or a new downstream channel specified by the CMTS in a downstream message after registration and after ranging on the new downstream channel).

Test 114 determines if any new ECE message has been received from the CMTS. If not, step 110 represented continued single channel DOCSIS operations is continued to be carried out. If a new ECE message has been received, test 116 is performed to determine if the ECE message adds or drops downstream channels. If new downstream channels are added to the CM's wideband DOCSIS collection, step 108 is performed again wherein the CM tunes unused tuners to the new downstream channel(s) designated in the ECE message and locks onto them. The CM then performs ranging using the associate upstream of the newly designated downstream channel, and processing following step 108 then proceeds as previously described.

If test 116 indicates the new ECE message requests dropping one or more downstream channels, step 118 is performed to drop the specified channels, and then step 120 is performed to continue DOCSIS operations on the remaining channels until power down or reboot.

Figure 6A:
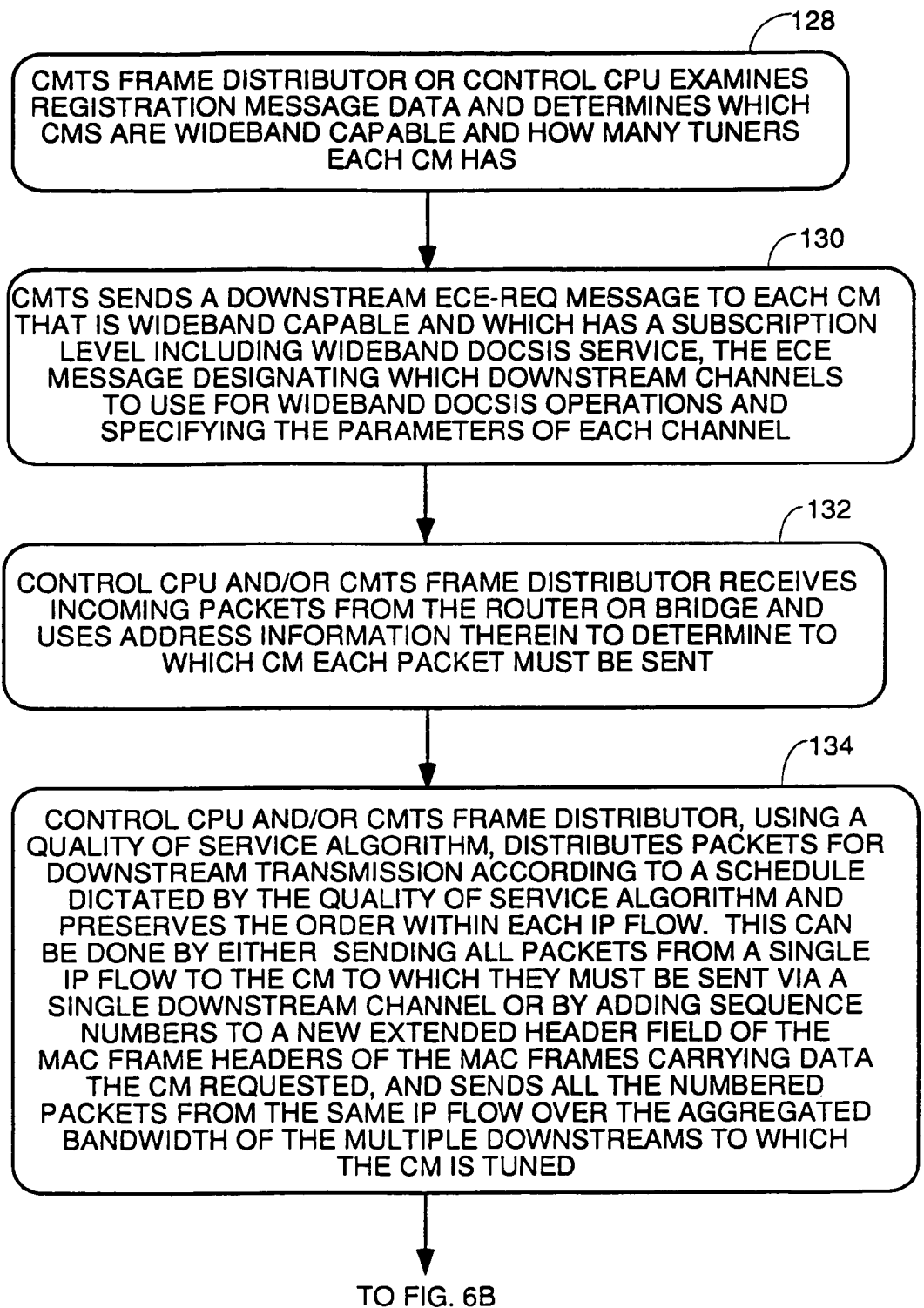
FIG. 6, comprised of FIGS. 6A and 6B, is a more detailed flowchart indicating the processes implemented in the CMTS and CM (but mainly the CMTS) to carry out wideband DOCSIS operations from a packet distribution, reception and ordering standpoint.
Figure 6B:
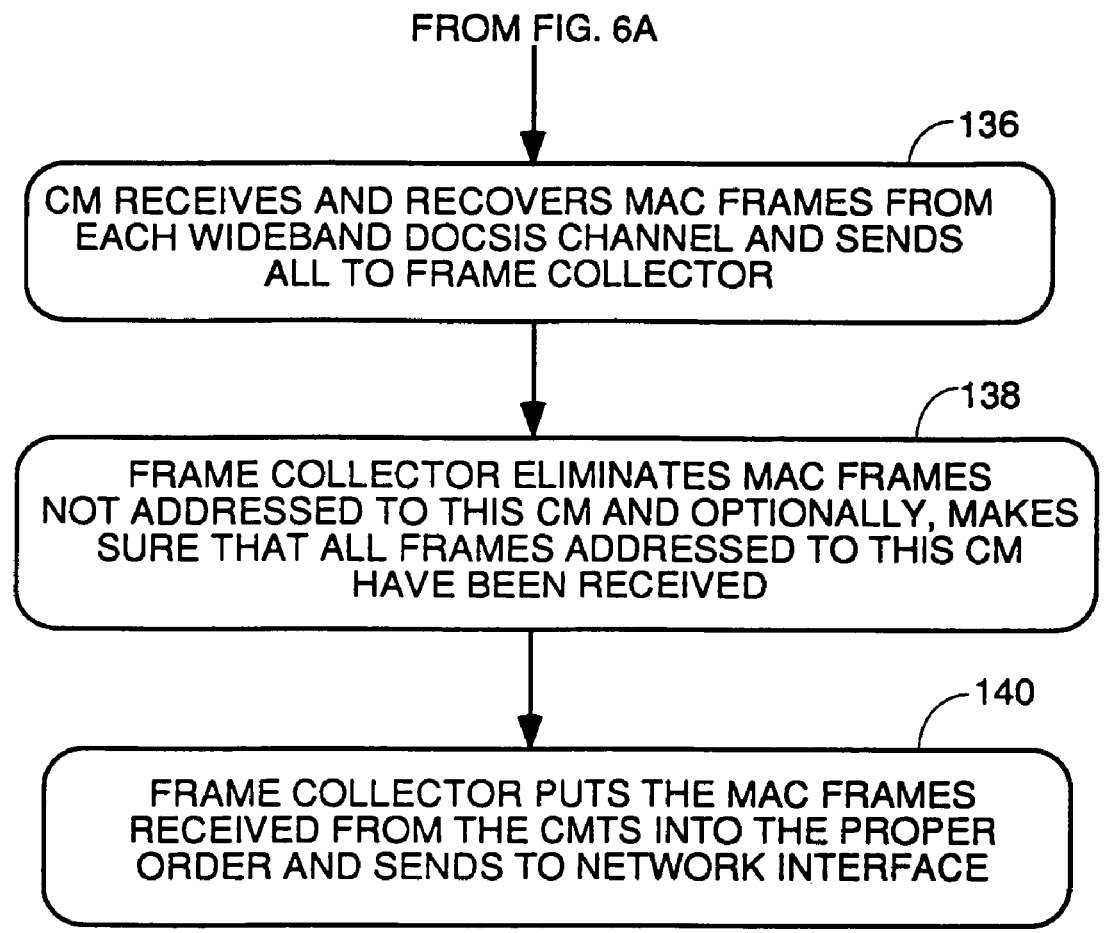

FIG. 6, comprised of FIGS. 6A and 6B, is a more detailed flowchart indicating the processes implemented in the CMTS and CM (but mainly the CMTS) to carry out wideband DOCSIS operations from a packet distribution, reception and ordering standpoint for a single IP flow. There may be many IP flows, so the processing of FIGS. 6A and 6B as to routing and distribution of packets on the CMTS side and collection and ordering the packets into the proper order at each CM are repeated for each IP flow.

Steps 128 and 130 simply establish which CMs are wideband capable and enable multiple downstreams, and are the same processes described in FIGS. 5A and 5B to establish wideband downstream DOCSIS. Step 128 represents the process of the CMTS frame distributor or a control CPU or both examining registration message data to determine which CMs are wideband DOCSIS capable and to determine how many tuners each CM has. The preferred embodiment is to have a control CPU such as CPU 242 in FIG. 12 cooperate with the upstream DOCSIS receivers to receive upstream registration messages from the CMs. The control CPU also receives upstream bandwidth requests and determines which CMs have upstream traffic and receives information from the router/bridge 30 as to which CMs have downstream traffic addressed to them. The control CPU then examines the registration data to determine which CMs are wideband DOCSIS capable and how many downstream channels each can tune simultaneously. The control CPU then populates a table, typically in the frame distributor, with data that maps CMs to downstream DOCSIS channels. This is important in systems where legacy CMs with only one tuner may be present and in systems where various CMs may have various numbers of tuners.

In step 130, the CMTS (control CPU in cooperation with downstream transmitters using table mapping downstream channels to CMs) sends a downstream ECE-REQ message to each CM that is wideband capable and which has a subscription for wideband DOCSIS service. The ECE message to each CM instructs it which downstream channels to use for wideband DOCSIS operations and specifies the operating parameters of each downstream channel. In some embodiments, the CMTS may send an ECE message to automatically enable all downstreams that a wideband CM can tune even if there is no traffic to that CM. In other embodiments, the ECE message is only sent after step 134 does its scheduling function and the need for additional downstream channels to particular CMs with heavy traffic is clear. In other embodiments, the ECE message may be sent to particular CMs based upon several criteria such as traffic load, whether the CM has a subscription for wideband DOCSIS, operator preferences, etc.

In step 132, the CMTS frame distributor receives incoming packets from the router and uses address information in each packet to determine to which CM the packet must be sent. Typically, each incoming packet from the WAN includes address information that identifies the IP address of the peripheral or process running in a peripheral coupled via a local area network or bus connection to the CM. The router has mappings between the IP addresses behind each CM and the MAC address of the CM stored in its routing tables. The router then determines the IP address in each packet and uses that IP address to look up in its routing tables the MAC address of the peripheral (also called Customer Premises Equipment or CPE) behind the CM to which the packet is addressed. The router has an ARP table which maps each IP address to a MAC address for each CPE behind a CM and the CM itself. In some embodiments, the ARP table is used to store numbers which can be used by the frame distributor to look up channel numbers such that the frame distributor can determine upon which channel to send each packet based upon the data in the ARP table. Each CM is a bridge, so the router puts the MAC address of the CPE in the packet, and the CM bridges it onto the LAN or bus coupled to the CPE. In other embodiments, other router processing and frame distribution schemes can be used to determine to which CM each packet is to be sent.

The downstream parameters such as frequency, modulation type, interleaver depth, symbol rate, etc. are determined automatically by the CM for the initial DOCSIS downstream to which it locks, but should be specified in the ECE message by the CMTS for additional DOCSIS downstreams.

The next job of the frame distributor, as symbolized by step 134, is to deliver all the packets of each IP flow to the CM to which they are supposed to be sent in order, or to at least manage transmissions such that the packets can be put in the correct order at the receiver. Generally, step 134 represents the process of the frame distributor distributing packets to optimize delivery and satisfy quality of service requirements. The frame distributor must always manage transmissions on the multiple downstream DOCSIS channels used by each wideband CM so as to preserve the packet ordering within an IP flow. This can be done in either of two ways. In a first class of embodiments, the correct order of frames in each IP flow is preserved by restricting the operation of the frame distributor to sending all the IP packets from each particular IP flow in the correct order on only one DOCSIS downstream. Packets from other IP flows can be sent on other downstreams in a similar fashion to the CMs to which they are addressed, and other IP flows to the same CM can be sent in order on another downstream of the wideband trunk being used by said same CM. In a second class of embodiments, the frame distributor adds a sequence numbers to each MAC frame and then sends the MAC frames addressed to each wideband DOCSIS CM to the CM using multiple downstream channels simultaneously.

In either class of embodiments, the frame distributor uses any quality of service algorithm to schedule downstream traffic transmissions to each CM, and then uses the multiple downstream channels each broadband DOCSIS CM is tuned to as described above in accordance with whichever of the first or second class of embodiments is being implemented.

Step 136 represents the process of the CM receiving and recovering MAC frames from each wideband DOCSIS channel to which the CM is tuned. All the MAC frames transmitted to all the CMs tuned to a particular downstream channel are received by each CM tuned to that downstream channel. All these MAC frames collected from all the wideband DOCSIS channels to which the CM is tuned are sent to the frame collector in the CM In step 138, the frame collector sorts through all the MAC frames received and discards any MAC frames not addressed to this CM. The frame collector then, in some embodiments, determines that all the MAC frames addressed to this CM have been received. This is done using sequence numbers in the MPEG encoding in the encapsulated MPEG frames or the sequence numbers added by the frame distributor to the DOCSIS frame header. In the preferred embodiment, step 138 is skipped altogether since DOCSIS is a "best efforts" transport mechanism. Step 138 is performed in embodiments where efforts to improve upon the DOCSIS "best efforts" transport mechanism are made.

Finally, in step 140, the frame collector puts the MAC frames addressed to this CM in the proper order and delivers them to the network interface.

Quality of Service

Since the additional DOCSIS downstream channels may be carrying MPEG compressed, encapsulated video or other high bandwidth services which cannot tolerate high latency lest buffer underrun occur, quality of service is important. Quality of service (QoS) is a methodology for examining the requirements of the services each CM has ordered and for which it has a valid subscription and looking at the CM's capabilities and then scheduling transmissions to meet the needs of the service while utilizing the CM's capabilities to the fullest.

Point to point trunked lines such as ISDN service where multiple B channels are used can carry multiplied flows identified by QoS parameters such as peak rate, average rate, etc. The QoS problem in point to point trunked lines has already been solved in the prior art, but the problem of providing QoS in trunked point-to-multipoint DOCSIS downstreams to provide wideband DOCSIS has not been previously solved.

For purposes of describing the QoS algorithm genus for the point-to-multipoint environment, the following terms are defined.

"Flow": a stream of data frames that conform to a given rule or have particular header information which differentiates them from other data frames of another flow, such as all data frames going to IP address 4.4.4.4 with UDP protocol on port 4000.

"QoS": the ability to shape flows according to traffic parameters such as peak rate, average rate, burst size, maximum allowable delay and maximum allowable jitter, and to comply with topological constraints such as which modems are broadband capable and how many tuners does each have.

"Link": a unidirectional fixed bandwidth pipe through which packets are sent such as a DOCSIS downstream (the bandwidth is fixed by the fixed symbol rate assigned to the DOCSIS downstream by the CMTS). A link can carry many flows. For example, multiple flows can be multiplexed into the link such as by use of statistical multiplexing or through use of any other form of multiplexing.

"Trunk": a set of links going the same direction and forming a single virtual link. The purpose of bundling links is to have flow with bandwidth capabilities exceeding those of a single link as well as improving the statistical multiplexing of flows. Each link in a trunk is referred to as a trunked link.

"Point to Multipont Trunk": a trunk with a single transmitter or CMTS and multiple receivers at least some of which can tune to multiple links in the trunk.

Figures 7, 8:
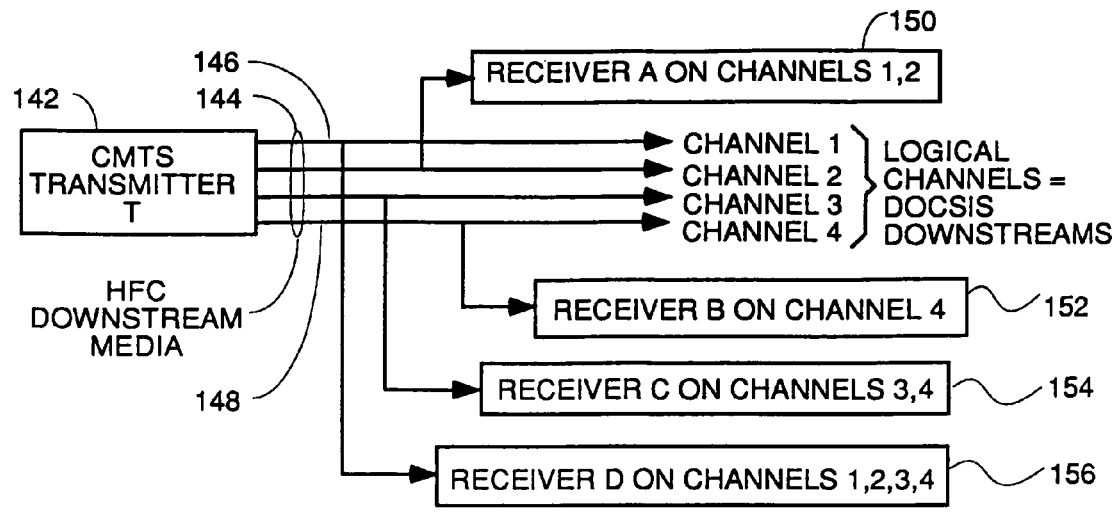
FIG. 7 is a diagram that illustrates the point-to-multipoint physical and logical channel architecture on an HFC system for purposes of explaining the QoS algorithm taught herein.
FIG. 8 is a table listing all the flows of the example of FIG. 7 which shows the source and destination of each flow, the flow ID and the characteristics of the flow in terms of its quality of service requirement.

FIG. 7 is a diagram that illustrates the point-to-multipoint physical and logical channel architecture on an HFC system for purposes of explaining the QoS algorithm taught herein. CMTS 142 has four downstream transmitters which transmit four separate DOCSIS downstreams of which downstream 146 and 148 are typical. In this example, these four DOCSIS downstreams will be referred to as channels 1, 2, 3 and 4. Four separate cable modems 150, 152, 154 and 156 are shown. Cable modem 152 is a legacy CM which can only tune one logical channel and is not wideband DOCSIS capable. The other three CMs are wideband DOCSIS capable. For example, CM 150 has two tuners which are tuned to channels 1 and 2 (after the above described protocols are performed and the CMTS orders CM 150 to tune to channels 1 and 2. CM 154 has been instructed to tune to logical channels 3 and 4, and CM 156 has been instructed to tune to channels 1, 2, 3 and 4. All four logical channels 1 through 4 are DOCSIS downstreams transmitted at different center frequencies on the downstream medium of HFC 144 and form a trunked line. Each of the channels 1–4 has a known bandwidth associated therewith which is established by the symbol rate established for the downstream channel by downstream UCD messages from the CMTS giving the channel parameters of each channel.

The CMTS 142 can transmit downstream on any of the four channels or all four simultaneously, but most of the CMs are limited in their capabilities by the number of tuners they have and can simultaneously receive data on only a subset of channels 1–4.

Each wideband DOCSIS capable CM has a number of flows established by the downstream ECE message which can be used to pass data to the CM. Each one of the flows may have an arbitrary QoS requirement to meet. FIG. 8 is a table listing all the flows of the example of FIG. 7 which shows the source and destination of each flow, the flow ID and the characteristics of the flow in terms of its quality of service requirement. Each row in FIG. 8 corresponds to one flow ID, and the flow ID is given in column 158. The source and destination of the flow is given in column 160, and the QoS requirement is given in column 162. For example, flow ID f-TA-1 has a best efforts QoS requirement with a peak rate of pA1.

As the CMTS transmits information to CMs 150 through 156 through the various flows, it needs an algorithm to schedule transmission on channels 1–4 which meets the various constraints caused by the topology of the receivers (such as which channels can be used to transmit data to which CMs) and which meets the desired flow characteristics. Using the aggregate capability of port trunking effectively cannot occur until this problem is solved.

The solution to this problem is a scheduler process which schedules flows to meet all the topological constraints and the desired flow characteristics. Any variant of the below described scheduler algorithm which solves this problem is within the teachings of the invention. Any hardware or software implementation of the below described QoS algorithm for the point-to-multipoint environment such as a DOCSIS HFC system is within the teachings of the invention.

Figure 9:
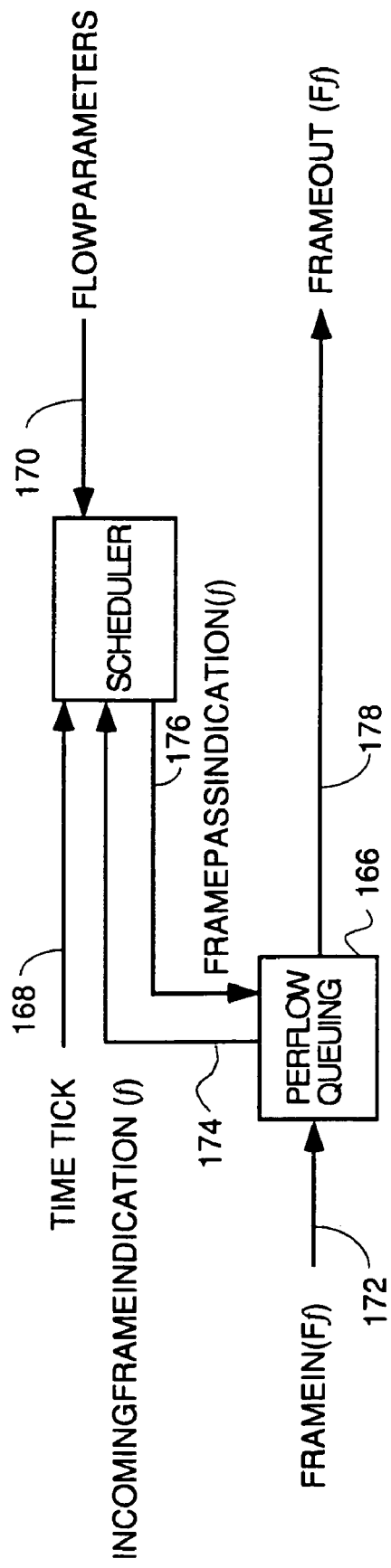
FIG. 9 is a block diagram of the functions that need to be performed to implement a scheduler to provide QoS functionality in the point-to-multipoint environment of a DOCSIS system implemented in HFC.

FIG. 9 is a block diagram of the functions that need to be performed to implement a scheduler to provide QoS functionality in the point-to-multipoint environment of a DOCSIS system implemented in HFC. A schedular 164 implements the QoS algorithm and controls release of frames to be transmitted from the Queue memory 166. There will be one Queue memory like memory 166 for each separate flow being managed by the scheduler. The scheduler receives as one input a clock on line 168. The scheduler also receives on line 170 the flow parameters of at least the flow the packets of which are stored in memory 166. As each new incoming frame to be transmitted is stored in memory 166 via line 172, an indication that a new frame has been stored in the memory and information regarding the size of the frame is sent to the scheduler 164 on line 174. This is done so that the scheduler can keep track of how full the memory is based upon knowledge that it retains as to how many frames have been stored in memory 166 and their sizes, and how many have been released for transmission over a given interval of time. The scheduler maintains this information to avoid overflow of memory 166. When the scheduler decides a frame of a flow must be released, it generates a frame pass signal on line 176. This causes memory 166 to output a frame for transmission on line 178. Memory 166 is a FIFO in a first embodiment where all frames from a single IP flow are restricted to be sent on the same link or channel. If the sequence numbering packetization embodiment is being implemented, the frames stored in memory 166 will have already been modified by the addition of sequence numbers, so memory 166 does not need to be a FIFO in this embodiment.

Figure 10:
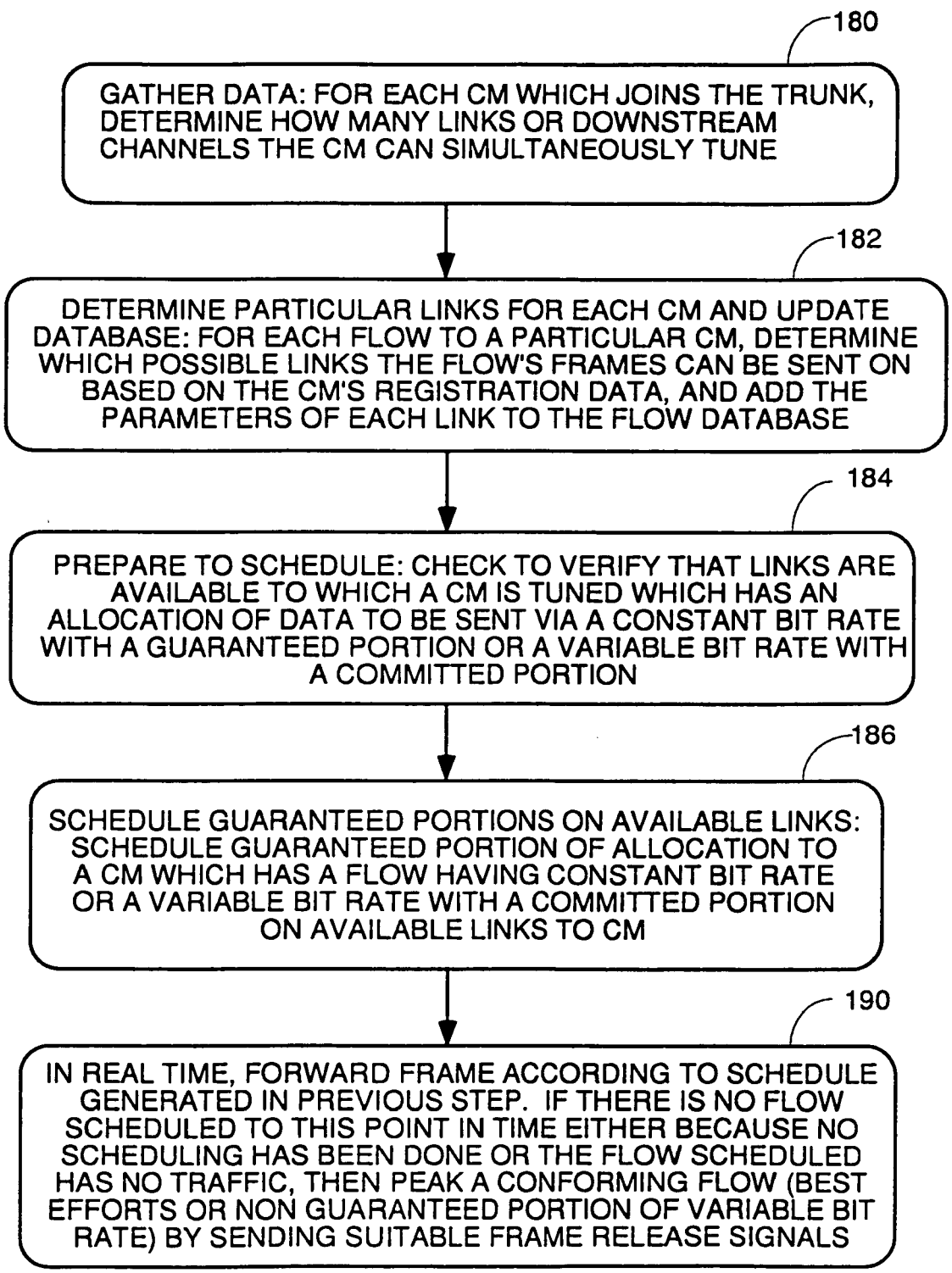
FIG. 10 is a flowchart of the preferred QoS algorithm.

FIG. 10 is a flowchart of the preferred QoS algorithm for scheduling flows for a single IP flow. This process is repeated for each IP flow. Although the process is described with regard to downstream wideband DOCSIS where the CMTS is doing the scheduling, it also can be used for upstream wideband DOCSIS, but the CMTS also does the wideband DOCSIS scheduling for the upstream as will be described below. Step 180 represents the process of gathering data for each CM that joins the trunk. This step determines how many links or downstream channels a CM that joined the trunk can simultaneously tune. This information is gleaned from the registration data supplied by the CM which indicates how many tuners it has. In step 182, the QoS algorithm controls the CMTS to determine the particular links or downstream channels that have been enabled for each CM and which the CM can actually use at this particular time for wideband DOCSIS. This is gleaned from the downstream MAP messages and ECE-REQ messages the CMTS has sent to each CM enabling various downstreams (ECE messages) and scheduling flows thereon (MAP messages). Step 184 represents the process to prepare a schedule to release frames. This step checks to verify that links are available for transmission to which a CM is tuned. This is done if said CM has an allocation of data with a constant bit rate with a guaranteed portion or a variable bit rate with a committed portion, but in other embodiments it will be done for any CM which has any allocation of data regardless of QoS requirements for the flow. The idea is to make sure links are available so that scheduling of guaranteed portions may be made.

Step 186 represents the process of scheduling release of frames to take care of transmitting the guaranteed portions of an allocation to a CM to which a flow with constant bit rate is directed, or to schedule the release of frames to take care of transmitting the committed portion of a variable bit rate flow to a CM which has such a flow directed to it. The scheduling sets the time of release of frames so as to meet the flow requirements of the guaranteed or committed portions.

Step 188 represents the process of generating frame release signals to memory 166 at the appropriate times according to the schedule established in step 186. This fulfills the guaranteed or committed portions of the flow bandwidths. The scheduler uses any times when no flow releases are scheduled or when there is no traffic to generate frame release signals for frames which are part of other flows such as best efforts or non guaranteed portions of variable bit rate flows. Frame release signals are generated so as to peak a conforming flow during these times.

The essential elements that all species of the downstream wideband DOCSIS process with QoS will share are as follows.

(1) There will be a process to determine which CMs are wideband capable and how many tuners each has that can be used for wideband DOCSIS.

(2) There will be a process to send a message to each CM which tells it how many downstream channels to tune and what their parameters are.

(3) There will be a process to determine the QoS parameter for each IP flow to a CM and what guaranteed portions of a constant bit rate IP flows exist for all IP flows and what committed portions of variable bit rate IP flows exist for all IP flows.

(4) There will be a process to store frames from each incoming IP flow and schedule release of frames of each guaranteed portion of a constant bit rate IP flow and schedule release of frames of the committed portion of variable bit rate IP flows.

(5) There will be a process to generate signals to release frames per the schedule to fulfill guaranteed and committed portions of IP flows and to look for gaps in the schedule when there is no traffic or no scheduled releases and use those times to release frames of other IP flows such as best efforts flows and the non guaranteed or non committed portions of constant bit rate flows or variable bit rate flows, respectively.

Figure 11A:
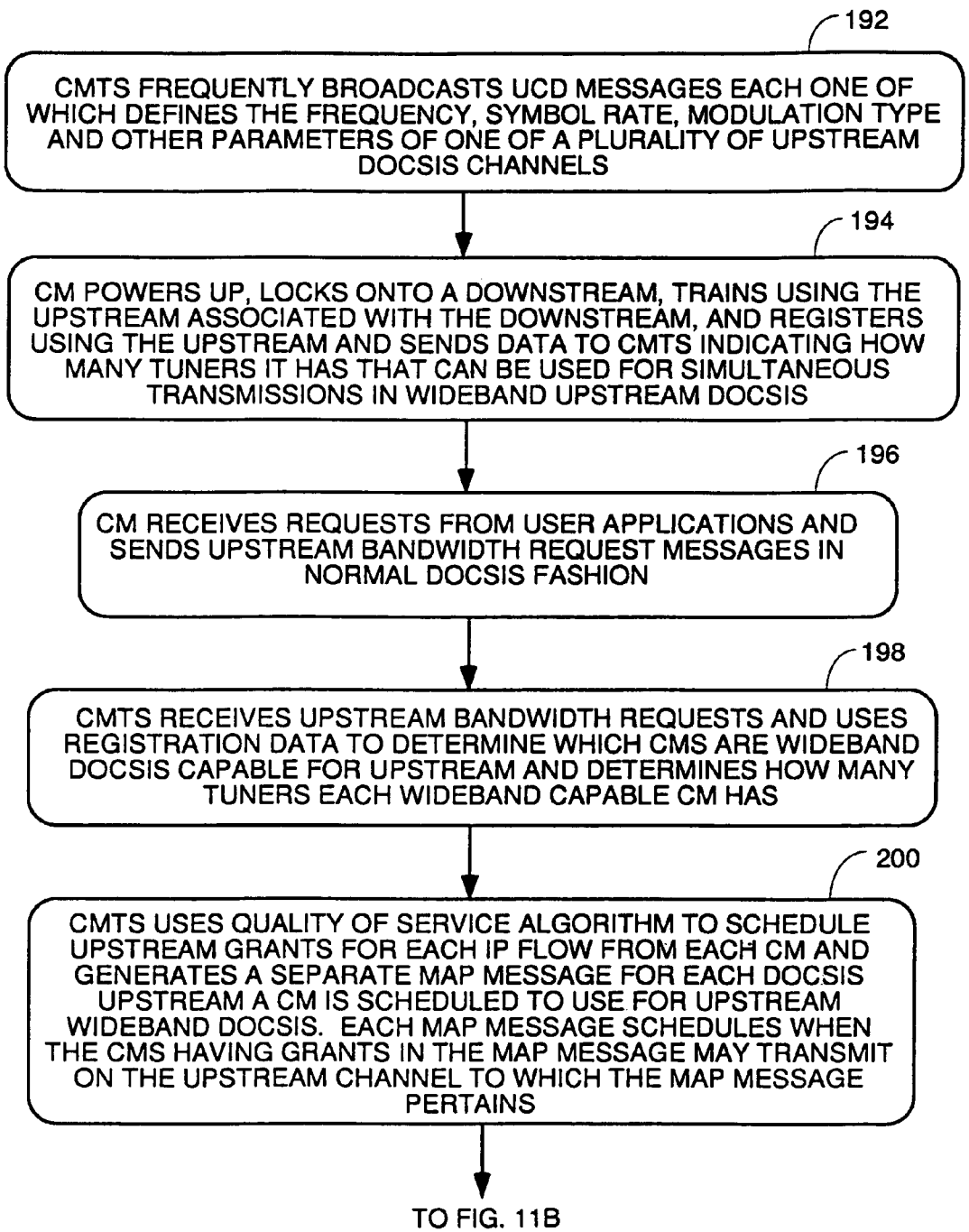
FIGS. 11A and 11B are a flowchart of the preferred upstream wideband DOCSIS protocol.
Figure 11B:
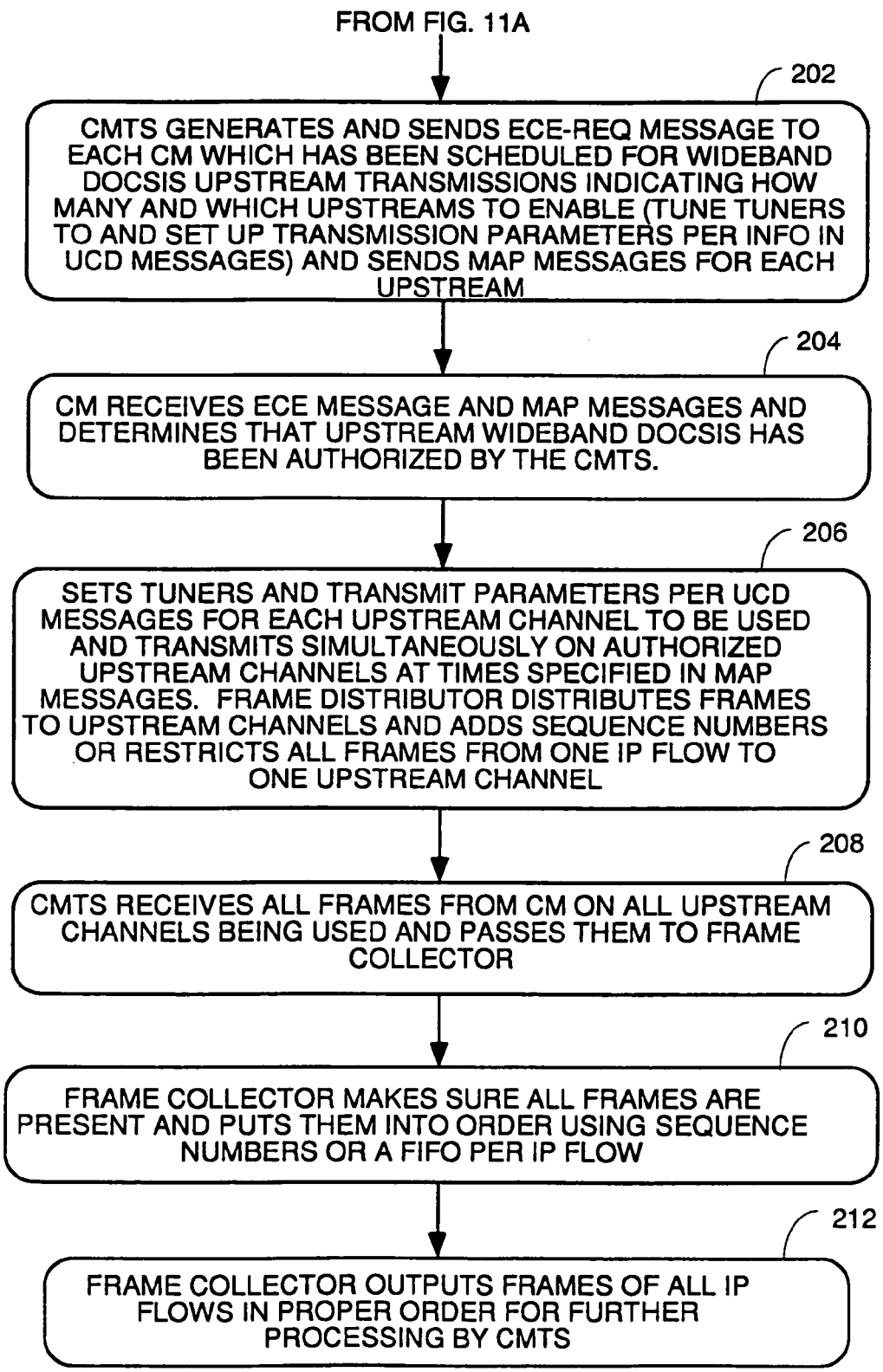

FIG. 11, comprised of FIGS. 11A and 11B, is a flowchart of the process of implementing upstream wideband DOCSIS. Step 192 represents the process whereby the CMTS broadcasts DOCSIS Upstream Channel Descriptor (UCD) messages identifying all the available upstreams and their channel parameters such as center frequency, symbol rate, modulation type etc. Step 194 represents the process of a CM powering up, searching for and locking onto any DOCSIS downstream, ranging using the upstream associated with the downstream to which it locked and registering using the same upstream and sending data to the CMTS which indicates how many tuners the CM has that can be used for upstream wideband DOCSIS. The CMTS may also send the CM a channel change message indicating it wants the CM to shift to another downstream and its associate upstream, and this too would be symbolized by step 194.

In step 196, the CM receives requests from user applications and sends upstream bandwidth request messages to the CMTS during bandwidth request contention intervals in the upstream MAP for the upstream channel to which the CM is tuned in a conventional DOCSIS fashion.

In step 198, the CMTS collects these upstream bandwidth requests from each CM and uses registration message data to determine which CMs are wideband DOCSIS capable for the upstream. The CMTS then uses the registration data to determine how many tuners each wideband capable CM has which may be used for wideband DOCSIS upstream operations.

Step 200 represents the process of using any quality of service algorithm, including the one depicted in the flowchart of FIG. 10 to schedule upstream grants for each IP flow from each CM which is upstream wideband DOCSIS capable. The schedules are put into MAP messages, one MAP message per upstream. Each MAP message identifies in a series of grants when each CM whose service identifier is included in the MAP message may transmit on the upstream to which the MAP pertains. Transmit parameters will be as listed in the UCD message for that upstream.

In step 202, the CMTS uses the schedule information in the MAP messages generated in step 200 to generate and send ECE-REQ messages to each CM which has been scheduled in the MAP messages for upstream wideband DOCSIS operation. The ECE messages to each such CM tell the CM how many upstreams to enable and which ones. The CM responds by tuning its tuners to the designated upstreams and sets up its transmitter to transmit on that upstream using the parameters of the UCD message for that upstream. The CMTS then broadcasts the MAP message generated in step 200 for each upstream to all the CMs tuned to the downstream to which the pertinent upstream is mapped.

In step 204, the CMs receive the ECE and MAP messages and each determines whether upstream wideband DOCSIS has been enabled for it. This can be done by drawing an inference from the MAP messages or ECE messages or by an express notification message in some embodiments. For example, the fact that a CM receives an ECE message telling it to enable multiple upstreams and the fact that an ECE message is peculiar to wideband DOCSIS supports the conclusion that the CM should use the enabled upstream channels for wideband DOCSIS operations. This can be confirmed when the CM examines the MAP messages for all the upstream channels it has been told to enable and finds multiple grants to it simultaneously on multiple upstream channels.

In step 206, the CM sets its tuners and transmit parameters for each enabled upstream channel per the parameters in the UCD messages pertaining to the enabled upstream channels. The CM then transmits its data simultaneously on the enabled upstream channels at the times designated in the MAP messages pertaining to each upstream channel. The CM does this using a frame distributor to distribute frames to the various upstream transmitters, and the frame distributor release frames at the appropriate times according to the MAP timing. MAP grants where no traffic is scheduled by the QoS algorithm or where no traffic exists are used to schedule the CM to release frames of IP flows of other QoS types that do not have guaranteed constant bit rates or committed bit rate portions of variable bit rate flows up to the peak rate of best efforts and other IP flows with other than guaranteed or committed bit rates.

The frame distributor in the CM can guarantee correct order of reception of all frames from an IP flow by either restricting all frames from a single IP flow to be sent on one upstream channel, or by adding sequence numbers as described previously for downstream wideband DOCSIS operation.

In step 208, the CMTS receives all frames from a CM on all the upstream channels assigned to it, and passes them to its frame collector. In step 210, the frame collector makes sure all the frames are there that are supposed to be there and puts them in order either by using a FIFO per IP flow in the first embodiment where each IP flow is restricted to one channel or by using the sequence numbers. The frame collector then outputs the frames of all IP flows in the proper order for further processing by the CMTS in step 212.

FIG. 12 is a block diagram of a system comprised of a plurality of wideband DOCSIS CMs that are capable of wideband DOCSIS transmissions in both the upstream and downstream direction along with one or more conventional single DOCSIS channel CMs, all coupled by a shared HFC system to a single CMTS. Block 214 is a wideband DOCSIS CM with both upstream and downstream wideband capabilities since is has multiple DOCSIS transmitters and multiple DOCSIS receivers (they may be combined into multiple DOCSIS transceivers). Two conventional DOCSIS receivers are shown at 216 and 218 and a frame collector is shown at 220. The DOCSIS receivers receive downstream wideband DOCSIS frames or packets and pass them to the frame collector. The receivers also receive downstream UCD and MAP and ECE messages and pass them to control computer 217. The frame collector makes sure all the packets that are supposed to be present are present and puts them into the proper order for delivery to NI or bus interface 222. The interface 222 delivers them to whatever peripheral is coupled to the CM via a LAN or bus.

Upstream packets are received by the NI/bus interface 222 and are passed to the frame distributor 224. The frame distributor receives information regarding which of upstream DOCSIS transmitters 216 and 218 to send each packet to and when from the control computer 217 via control path 230. The control computer determines to which upstream transmitter each packet is to be transferred to and when from information in the downstream ECE and MAP messages from the CMTS. The control computer also configures each upstream DOCSIS transmitter via control path 232 to transmit on one of the DOCSIS upstreams designated in the downstream ECE message using the parameters designated for the DOCSIS upstream in the UCD message pertaining to the DOCSIS upstream in question. The DOCSIS receivers are configured via control path 232 to receive on the DOCSIS downstreams designated in the ECE message in accordance with whatever the parameters of those DOCSIS downstreams are. The control computer 217 orchestrates operation of all these circuits to perform the following functions:

powering up, finding a DOCSIS downstream and locking onto it, and using a DOCSIS upstream to perform conventional DOCSIS ranging including ranging and equalization and sending an acknowledgment message indicating whether or not ranging has been successful, and sending a registration message to said CMTS which advertises the CM's wideband upstream DOCSIS capabilities;

receiving a plurality of Upstream Channel Descriptor (UCD) messages, each of which describes the frequency, symbol rate, modulation type and other parameters of a DOCSIS upstream;

receiving requests from user applications to send data upstream and responding thereto by sending upstream bandwidth requests;

receiving an Extended Channel Enable message which indicates which upstream DOCSIS channels to use for wideband DOCSIS upstream operations, and receiving a plurality of MAP messages, each pertaining to a single DOCSIS upstream channel and defining when said CM may transmit on said channel;

setting up the transmitters of said CM to transmit on the upstream DOCSIS channels designated in said ECE messages in accordance with the parameters in the UCD message pertaining to the appropriate upstream channe*l, and timing the transmission of upstream data on the designated channels per grants in said MAP messages pertaining to said channels.

The wideband capable CMTS 236 is structured the same and operates the same as discussed above for FIG. 2 for the downstream. The wideband DOCSIS upstream portion of the CMTS comprises a plurality of DOCSIS receivers 238 and 240 which are configured by control computer 242 in accordance with the data in the downstream UCD messages sent to the CM. The CMTS control computer knows from the MAP messages which CM's data it is receiving at any particular minislot and which upstream DOCSIS channel to which it has been assigned. It also knows the parameters of that upstream channel so it sets up each receiver via control path 246 to receive according to the proper parameters. The receivers pass all the frames they receive to frame collector 244 which functions like the frame collectors in the CMs to make sure all the frames that are supposed to have been transmitted during the grant to any particular CM have arrived. The frame collector then puts the frames of each IP flow into the proper order and delivers them to the router 30 via path 248.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A process for performing downstream DOCSIS (Data Over Cable Service Interface Specification) in a point-to-multipoint environment comprising a cable modem termination system (CMTS) which includes one or more CMTS transmitters coupled to a plurality of cable modems (CMs) by a shared transmission medium, the process comprising:
   determining which of the plurality of cable modems is wideband capable and how many downstream channels each wideband capable cable modem can simultaneously use;
   sending an extended channel enable message to each wideband capable cable modem, said extended channel enable message identifying one or more downstream channels to which said wideband-capable cable modem should tune for reception of wideband downstream DOCSIS transmissions;
   processing, in a frame distributor, distribution of frames to CMTS transmitters transmitting on downstream channels to which a CM has been instructed to tune so as to schedule the frames in a manner facilitating the reassembly of the frames into proper order as necessary to meet quality of service requirements, including adding sequence numbers; and
   distributing the frames to the transmitters;
   transmitting the distributed frames addressed to a wideband capable cable modem on the one or more downstream channels to which said wideband capable cable modem has been instructed to tune; and
   in each cable modem:
   powering up or rebooting and searching for and locking onto a DOCSIS downstream;
   ranging using a DOCSIS upstream associated with a DOCSIS downstream to which the cable modem locked, and registering with the CMTS as a CM on the system;
   sending information to the CMTS indicating how many tuners the CM has which are capable of use in downstream wideband DOCSIS;
   receiving an ECE (Extended Channel Enable) message from the CMTS indicating how many and which downstream channels will be used for wideband DOCSIS transmissions to the CM and responding thereto by tuning a tuner of the CM to each of the downstream channels designated in the ECE message;
   receiving wideband downstream DOCSIS frames simultaneously transmitted on two or more downstream channels designated by the ECE message and verifying that all frames have been received; and
   putting said received wideband downstream DOCSIS frames into the proper order, and delivering same to a peripheral device coupled to the CM for further processing.

2. The process of claim 1 further comprising:
   determining if any new ECE messages have arrived from the CMTS;
   if a new ECE message has arrived, determining whether the ECE message adds or drops any downstream channels;
   if the ECE message adds a downstream DOCSIS channel, tuning one or more tuners to the added DOCSIS downstream-channel and performing ranging on the added DOCSIS downstream channel using a DOCSIS upstream associated therewith;
   sending an acknowledge message indicating success or failure in ranging on each added DOCSIS downstream channel;
   starting wideband DOCSIS operations on any added DOCSIS downstream channels; and
   if a new ECE message has arrived that drops a DOCSIS downstream channel, dropping the specified channel and continuing DOCSIS downstream operations on any remaining DOCSIS downstream channels.

3. A process for performing downstream DOCSIS (Data Over Cable Service Interface Specification) in a point-to-multipoint environment comprising a cable modem termination system (CMTS) which includes one or more CMTS transmitters coupled to a plurality of cable modems (CMs) by a shared transmission medium, the process comprising:
   determining which of the plurality of cable modems is wideband capable and how many downstream channels each wideband capable cable modem can simultaneously use;
   sending an extended channel enable message to each wideband capable cable modem, said extended channel enable message identifying one or more downstream channels to which said wideband-capable cable modem should tune for reception of wideband downstream DOCSIS transmissions;
   processing, in a frame distributor, distribution of frames to CMTS transmitters transmitting on downstream channels to which a CM has been instructed to tune so as to schedule the frames in a manner facilitating the reassembly of the frames into proper order as necessary to meet quality of service requirements, including adding sequence numbers; and
   distributing the frames to the transmitters;

transmitting the distributed frames addressed to a wideband capable cable modem on the one or more downstream channels to which said wideband capable cable modem has been instructed to tune;
wherein processing further comprises:
determining the particular downstreams to which each wideband DOCSIS CM is tuned using registration data and data from transmitted ECE messages and determining particular IP flows directed to each wideband CM from header data in packets received from a router;
verifying which downstream channels to which a particular CM is tuned and which has an IP flow to be sent to it are available for transmission and determining quality of service requirement of each IP flow;
scheduling guaranteed portions of constant bit rate flows and committed portions of variable bit rate flows on available downstream DOCSIS channels to which CMs are tuned which have IP flows with quality of service requirements which are constant bit rate or variable bit rate flows with guaranteed portions;
generating frame release signals and release and transmit frames at scheduled times on appropriate downstream DOCSIS channels to fulfill the guaranteed bit rates of constant bit rate Quality of Service IP flows and to fulfill committed bit rate portions of variable bit rate Quality of Service IP flows; and
for any wideband downstream CMs which have IP flows directed thereto with other than guaranteed bit rate Quality of Service IP flows or variable bit rate Quality of Service IP flows with committed portions, using any times on DOCSIS downstream channels to which the CMs are tuned when no releases of frames to the CM or other CMs are scheduled or when there is no traffic to release frames directed to the CMs which have IP flows directed thereto with other than guaranteed bit rate Quality of Service IP flows or variable bit rate Quality of Service IP flows with committed portions.

4. A process carried out in a cable modem (CM) during wideband DOCSIS (Data Over Cable Service Interface Specification) downstream processing, comprising the steps:
powering up and locking onto a DOCSIS downstream and performing DOCSIS ranging including ranging and equalization and receiving time, frequency, phase and power offsets in a messages from a cable modem termination system (CMTS);
sending an acknowledgement message if said ranging was successful and registering, in a registration message, with said CMTS as a CM in the system, said registration message including data regarding the wideband DOCSIS capability of said CM;
receiving an Extended Channel Enable (ECE) message from said CMTS that indicates which DOCSIS downstream channels said CM should get ready to receive wideband DOCSIS data upon, and reacting thereto by setting up a plurality of DOCSIS receivers to receive data on the DOCSIS downstream channels designated in said ECE message;
receiving a plurality of frames or packets transmitted simultaneously on a plurality of DOCSIS channels representing one or more IP flows;
verifying that all packets or frames have been received that are supposed to be received; and putting said frames or packets into the correct order and delivering said frames or packets for further processing.

5. A process for performing wideband DOCSIS (Data Over Cable Service Interface Specification) transmissions upstream from a cable modem (CM) which is part of a plurality of cable modems coupled to a cable modem termination system (CMTS) via a shared transmission medium, comprising the steps:
broadcasting from said CMTS a plurality of Upstream Channel Descriptor (UCD) messages, each of which defines the frequency, symbol rate, modulation type and other parameters of a DOCSIS upstream identified in said UCD message;
after a CM has locked onto a downstream and sent a ranging burst, the CMTS makes measurements and performs equalization convergence and sends one or more messages downstream to said CM which give it time, frequency and power offsets and upstream equalization coefficients;
after the CM has successfully ranged and sent an acknowledgment thereof and sent a registration message which advertises its capabilities, the CMTS receives these messages and stores at least some of the data therein indicating the CM's wideband capabilities and determines whether the CM is wideband capable;
the CMTS receives upstream bandwidth requests from the CM and from other CMs and uses registration data to determine which CMs are upstream wideband DOCSIS capable and determines how many upstream channels each CM which has requested upstream bandwidth can simultaneously transmit upon;
the CMTS analyzes the requested upstream traffic and registration and subscription data and determines which upstream channels to assign to which CMs for upstream wideband DOCSIS operation;
the CMTS uses a quality of service algorithm to schedule upstream grants for each IP flow from each CM and generates separate MAP messages for each DOCSIS upstream a CM is scheduled to use for upstream wideband DOCSIS, each MAP message scheduling when the CM or CMS having grants in the MAP message may transmit on the DOCSIS upstream to which the MAP message pertains;
the CMTS uses the grants in the MAP messages to determine which CMs that are wideband DOCSIS capable need to use multiple upstream DOCSIS channels, and sends an ECE message to each CM which is being authorized to send upstream wideband DOCSIS transmissions, each ECE message designating which upstream DOCSIS channels the CM may use and sends the MAP messages;
after the CMs which have been enabled for upstream wideband DOCSIS have transmitted data according to the MAP, ECE and UCD messages, the CMTS receives all frames and passes them to a frame collector which makes sure all frames are there and puts them into the correct order for delivery.

6. A process carried out in a cable modem (CM) which is one of a plurality of cable modems coupled by a shared transmission medium to a cable modem termination system (CMTS) for performing upstream wideband DOCSIS (Data Over Cable Service Interface Specification) transmissions, comprising the steps:
powering up, finding a DOCSIS downstream and locking onto it, and using a DOCSIS upstream to perform conventional DOCSIS ranging including ranging and equalization and sending an acknowledgment message indicating whether or not ranging has been successful, and sending a registration message to said CMTS which advertises the CM's wideband upstream DOCSIS capabilities;

receiving a plurality of Upstream Channel Descriptor (UCD) messages, each of which describes the frequency, symbol rate, modulation type and other parameters of a DOCSIS upstream;

receiving requests from user applications to send data upstream and responding thereto by sending upstream bandwidth requests;

receiving an Extended Channel Enable message which indicates which upstream DOCSIS channels to use for wideband DOCSIS upstream operations, and receiving a plurality of MAP messages, each pertaining to a single DOCSIS upstream channel and defining when said CM may transmit on said channel;

setting up the transmitters of said CM to transmit on the upstream DOCSIS channels designated in said ECE messages, and timing the transmission of upstream data on the designated channels per grants in said MAP messages pertaining to said channels.

7. A cable modem apparatus comprising:

a plurality of DOCSIS (Data Over Cable Service Interface Specification) transmitters, each having an input;

a frame distributor having a plurality of outputs coupled to said inputs of said transmitters and having an input;

a plurality of DOCSIS receivers having inputs coupled to a hybrid fiber coaxial cable system and a plurality of outputs;

a frame collector having a plurality of inputs coupled to said plurality of outputs of said plurality of DOCSIS receivers and having an output;

a network interface or bus interface having an input coupled to said output of said frame collector and having an output coupled to said frame distributor; and control computer coupled to said plurality of DOCSIS transmitters and said plurality of DOCSIS receivers and said frame distributor and said frame collector and programmed to operations of said cable modem to perform the following functions:

powering up, finding a DOCSIS downstream and locking onto it, and using a DOCSIS upstream to perform DOCSIS ranging including ranging and equalization and sending an acknowledgment message indicating whether or not ranging has been successful, and sending a registration message to a CMTS which advertises the CM's wideband upstream DOCSIS capabilities;

receiving a plurality of Upstream Channel Descriptor (UCD) messages, each of which describes the frequency, symbol rate, modulation type and other parameters of a DOCSIS upstream;

receiving requests from user applications to send data upstream and responding thereto by sending upstream bandwidth requests;

receiving an Extended Channel Enable message which indicates which upstream DOCSIS channels to use for wideband DOCSIS upstream operations, and receiving a plurality of MAP messages, each pertaining to a single DOCSIS upstream channel and defining when said CM may transmit on said channel;

setting up the transmitters of said CM to transmit on the upstream DOCSIS channels designated in said Extended Channel Enable message in accordance with the parameters in the UCD message pertaining to the appropriate upstream channel, and timing the transmission of upstream data on the designated channels per grants in said MAP messages pertaining to said channels.

8. The apparatus of claim 7 wherein said control computer is also programmed to orchestrate coordination of said circuits of said cable modem to perform the following functions:

receiving an Extended Channel Enable (ECE) message from said CMTS that indicates which DOCSIS downstreams said CM should get ready to receive wideband DOCSIS data upon, and reacting thereto by setting up a plurality of DOCSIS receivers to receive data on the DOCSIS downstreams designated in said ECE message;

receiving a plurality of frames or packets transmitted simultaneously on a plurality of DOCSIS downstream channels representing one or more IP flows;

verifying that all packets or frames have been received that are supposed to be received; and putting said frames or packets into the correct order and delivering said frames or packets for further processing.

9. A cable modem termination system capable of wideband DOCSIS (Data Over Cable Service Interface Specification) operation, comprising:

a plurality of DOCSIS transmitters each having an output for coupling to a hybrid fiber coaxial (HFC) cable system, and each having an input;

a frame distributor having an input and having a plurality of outputs, each said outputs coupled to an input of one of said DOCSIS transmitters, and having an input;

a plurality of DOCSIS receivers, each having an input for coupling to said HFC system, and each having an output;

a frame collector having a plurality of inputs each coupled to an output of one of said DOCSIS receivers and having an output;

a router having an input coupled to said output of said frame collector and having an output coupled to said input of said frame distributor; and a control computer coupled to said plurality of DOCSIS transmitters and receivers and to said frame distributor and to said frame collector and to said router, and programmed to orchestrate the following functions:

receiving registration message data from CMs and determining therefrom which cable modems are wideband DOCSIS downstream capable and how many downstream channels each can simultaneously use;

sending an extended channel enable message to each wideband capable cable modem telling it which downstream channels to which it should tune for reception of wideband downstream DOCSIS transmissions;

processing incoming frames from said router to be sent downstream to a particular CM in a frame distributor to schedule the distribution of frames to the various CMTS downstream transmitters transmitting on the downstream channels to which said CM is tuned so as to meet quality of service requirements, and adding sequence numbers or other processing to guarantee the frames can be put into the proper order at the CM, and distributing the frames to said CMTS downstream transmitters in accordance with said schedule;

transmitting the distributed frames addressed to a particular CM to that CM on the downstream channels to which said CM has been instructed to tune.

* * * * *